(12) United States Patent
Jaramillo

(10) Patent No.: US 12,210,404 B2
(45) Date of Patent: Jan. 28, 2025

(54) LOCKUP DETECTION CIRCUIT FOR AN eUSB REPEATER

(71) Applicant: NXP USA, Inc.

(72) Inventor: Kenneth Jaramillo, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/073,510

(22) Filed: Dec. 1, 2022

(65) Prior Publication Data

US 2024/0184656 A1 Jun. 6, 2024

(51) Int. Cl.
*G06F 11/07* (2006.01)
*G06F 11/14* (2006.01)
*G06F 11/30* (2006.01)

(52) U.S. Cl.
CPC ...... *G06F 11/0757* (2013.01); *G06F 11/0745* (2013.01); *G06F 11/1441* (2013.01); *G06F 11/3027* (2013.01)

(58) Field of Classification Search
CPC ............. G06F 11/0757; G06F 11/0745; G06F 11/1441; G06F 11/3027
See application file for complete search history.

(56) References Cited

U.S. PATENT DOCUMENTS

| | | |
|---|---|---|
| 5,243,623 A | 9/1993 | Murdock |
| 5,289,415 A | 2/1994 | DiMarco et al. |
| 5,371,763 A | 12/1994 | Ota et al. |
| 5,414,310 A | 5/1995 | Fattaruso |
| 5,466,944 A | 11/1995 | Krause |
| 5,671,376 A | 9/1997 | Bucher et al. |
| 5,861,828 A | 1/1999 | Pris |
| 6,119,183 A | 9/2000 | Briel et al. |
| 6,260,092 B1 * | 7/2001 | Story .................. G06F 13/4273 710/315 |
| 6,304,496 B1 | 10/2001 | Tsukikawa |
| 6,700,970 B1 | 3/2004 | Aronson et al. |
| 6,731,139 B1 | 5/2004 | Wert et al. |
| 8,078,768 B2 | 12/2011 | Manor et al. |
| 9,239,810 B2 | 1/2016 | Chen et al. |
| 10,802,566 B1 | 10/2020 | Lam et al. |
| 10,891,242 B2 | 1/2021 | Wente et al. |
| 2002/0003436 A1 | 1/2002 | Andrews et al. |
| 2002/0087606 A1 | 7/2002 | Harness et al. |

(Continued)

OTHER PUBLICATIONS

Apple Inc. et al.; "Embedded USB2 (eUSB2) Physical Layer Supplement to the USB Revision 2.0 Specification"; Revision 1.2; 2018; 169 pgs.

(Continued)

*Primary Examiner* — Gabriel Chu

(57) ABSTRACT

Embodiments of a method and a device of lockup detection for an eUSB repeater are described. In an embodiment, the method involves detecting received data at an analog receiver on a first side of the eUSB repeater, detecting an enable signal for an analog transmitter on a second side of the eUSB repeater, detecting an idle condition of the analog receiver on the first side of the eUSB repeater after detecting the enable signal, setting a timer, determining that the timer has elapsed, and resetting the eUSB repeater after the timer has elapsed while an idle condition is detected on the first side and the enable signal is detected on the second side of the eUSB repeater.

20 Claims, 10 Drawing Sheets

(56) References Cited

U.S. PATENT DOCUMENTS

| | | |
|---|---|---|
| 2002/0181402 A1 | 12/2002 | Lemoff et al. |
| 2005/0246125 A1 | 11/2005 | Marsh et al. |
| 2007/0219748 A1* | 9/2007 | Iwasa .................. G06F 11/1417 |
| | | 702/182 |
| 2008/0140907 A1 | 6/2008 | Dreps et al. |
| 2008/0195792 A1 | 8/2008 | Teil et al. |
| 2009/0303883 A1 | 12/2009 | Kucharczyk et al. |
| 2013/0111076 A1* | 5/2013 | Vaynberg .................. G06F 5/14 |
| | | 710/18 |
| 2014/0006664 A1 | 1/2014 | Chen et al. |
| 2014/0006674 A1* | 1/2014 | Chan .................. G06F 13/4221 |
| | | 710/313 |
| 2014/0359176 A1 | 12/2014 | Kim |
| 2015/0227489 A1 | 8/2015 | Chen et al. |
| 2015/0269112 A1 | 9/2015 | Hsueh et al. |
| 2016/0162427 A1 | 6/2016 | Kang et al. |
| 2016/0269126 A1* | 9/2016 | Maung .................. H04B 10/29 |
| 2017/0181081 A1 | 6/2017 | Kim |
| 2018/0285308 A1 | 10/2018 | Liu et al. |
| 2019/0056873 A1 | 2/2019 | Zhu et al. |
| 2022/0206556 A1 | 6/2022 | Erdogan et al. |
| 2023/0155604 A1 | 5/2023 | Greenslade |

OTHER PUBLICATIONS

U.S. Appl. No. 18/073,507, filed Dec. 1, 2022, 59 pages.
Embedded USB2 (eUSB2) Physical Layer Supplement to the USB Revision 2.0 Specification Revision 1.1 (Year: 2018).
U.S. Appl. No. 18/073,507 Non-Final Office Action mailed Apr. 17, 2024, 21 pages.
U.S. Appl. No. 18/073,507 Final Office Action mailed Jul. 30, 2024, 20 pages.
U.S. Appl. No. 18/073,507 Notice of Allowance mailed Oct. 17, 2024, 7 pages.

* cited by examiner

LOCKUP DETECTION CIRCUIT FOR AN eUSB REPEATER

BACKGROUND

Universal Serial Bus (USB) has been an extreme success as a standard for short-range wired data communication in the electronics industry. USB use is ubiquitous for peripheral devices, accessories, and internal connections and it continues to be the ascendant serial interconnect for electronic devices. USB was originally developed as a universal bus to connect a computer to external peripheral devices and accessories, for example, printers, scanners, keyboards, microphones, and gaming controllers. As the speed of the bus increased and the cost of supporting chips decreased more types of devices were added. A part of the extreme success is backwards compatibility that allows a keyboard, 25 years old, designed for a 1.5 Mbps interface to be attached to a new 10 Gbps socket connector using the keyboard's original USB Type A-plug connector. Low-Speed, Full-Speed, and High-Speed Modes are still supported in all USB connectors USB is also being used as a high-speed data interface within many computers and portable devices. For example, a built-in camera, touch sensor, keypad, microphone, memory, and other devices may all be connected internally using USB. To improve these internal connections, embedded USB 2.0 (eUSB2) allows systems with advanced technology nodes to operate with USB 2.0 in Low Speed (LS) mode, Full Speed (FS) mode, and High Speed (HS) modes similar to USB 2.0 at lower cost. eUSB2 allows data to be carried at less cost on printed circuit board traces, when desired and without the power supply connections of USB.

USB was originally established with 3.3V signaling for data and control. 3.3V was considered low voltage at the time and has been maintained for backwards compatibility, among other reasons. As silicon device geometries shrink, support for what are now higher voltages, for example 3.3V, is not possible in newer smaller device geometries. To allow advanced USB Hosts and Devices to use advanced silicon device geometries, the eUSB2 Specification defines a lower signaling voltage, for example, 1.0V, and then defines an eUSB2 repeater as an interface between the two voltages. The repeater converts the lower voltages of eUSB2, used within advanced USB Hosts and Devices, to the higher voltages of USB signaling between devices and vice versa. In addition, during Low-Speed and Full-Speed modes, the repeater also translates the protocol timing between the eUSB2 and USB busses.

To further eliminate unnecessary cost, eUSB2 uses single-ended signaling in Low Speed and Full Speed mode. Single-ended signaling uses one wire or conductor for the signal and relies on an available common reference voltage which is normally readily accessible within an embedded system on an integrated circuit (IC) and on a printed circuit board (PCB). USB uses differential signaling which uses two wires with opposite polarity to both send the same signal. Differential signaling is more reliable with external wired connectors. In these legacy modes, the eUSB2 repeater also converts differential signaling to single-ended signaling and vice versa.

SUMMARY

Embodiments of a method and a device are disclosed. In an embodiment, a method of lockup detection for an eUSB repeater is disclosed. In an embodiment, the method involves detecting received data at an analog receiver on a first side of the eUSB repeater, detecting an enable signal for an analog transmitter on a second side of the eUSB repeater, detecting an idle condition of the analog receiver on the first side of the eUSB repeater after detecting the enable signal, setting a timer, determining that the timer has elapsed, and resetting the eUSB repeater after the timer has elapsed while an idle condition is detected on the first side and the enable signal is detected on the second side of the eUSB repeater.

In an embodiment, detecting an idle condition comprises detecting that two input lines to the analog receiver are both low. In an embodiment, detecting an idle condition comprises detecting that an Idle "J" state is present on two input lines to the analog receiver. In an embodiment, detecting an idle condition comprises detecting that an input line to the analog receiver is high and another input line to the analog receiver is low.

In an embodiment, the method includes determining a speed mode of the eUSB repeater and detecting an idle condition based on the speed mode. In an embodiment, the method includes resetting the timer whenever the idle condition is not present on the first side of the eUSB repeater. In an embodiment, the timer has a duration of at least 10 USB Low Speed Unit Intervals (UI). In an embodiment, determining that the timer has elapsed comprises detecting that the enable signal is active for the duration of the timer. In an embodiment, determining that the timer has elapsed comprises detecting that the analog receiver is receiving an SE0 (Single-Ended Zero) idle (eUSB) or a J (USB) for the duration of the timer.

In an embodiment, the method further involves generating a possible lockup signal when the idle condition is detected and the enable signal is detected, and applying the possible lockup signal to a counter, wherein determining that the timer has elapsed comprises determining that the counter has incremented to reach a pre-configured count.

In an embodiment, resetting the eUSB repeater comprises applying reset signals to state elements of the eUSB repeater that control the data signal paths. In an embodiment, resetting the eUSB repeater comprises applying reset signals to state elements of the eUSB repeater that control the control signal paths. In an embodiment, resetting the eUSB repeater comprises applying reset signals to flip-flops of the eUSB repeater that determine an end of packet.

In an embodiment a lockup detection circuit for an eUSB repeater is described. The device includes a first logic gate coupled to an analog receiver of the eUSB repeater to generate an idle signal upon detecting an idle condition of an input of the analog receiver, an AND gate coupled to the first logic gate and to an analog transmitter of the eUSB repeater to receive an enable signal, the AND gate to generate a possible lockup signal upon receiving the idle signal and the enable signal, a timer coupled to the possible lockup signal, the timer being started in response to the possible lockup signal, and a second logic gate to reset the eUSB repeater after the timer has elapsed while the idle condition is detected and the enable signal is detected.

In an embodiment, the analog receiver is coupled to two input lines of a first bus and the first logic gate detects the idle condition upon detecting that the two input lines are both low. In an embodiment, the first logic gate is coupled to a mode selector signal to indicate a low speed mode or a full speed mode, the first logic gate being configured to generate the idle signal in response to the mode selector signal and an idle condition of an input of the analog receiver.

In an embodiment an eUSB repeater is described. The device includes an analog receiver coupled to a first bus, an analog transmitter coupled to a second bus having an enable signal that is active when the analog transmitter is active, repeating mode logic between the analog receiver and the analog transmitter to repeat data received on the first bus through the analog receiver to the second bus through the analog transmitter, and a lockup detection circuit having a first logic gate coupled to the analog receiver to generate an idle signal upon detecting an idle condition of the analog receiver, an AND gate coupled to the first logic gate and to the analog transmitter to receive the enable signal, the AND gate to generate a possible lockup signal upon receiving the idle signal and the enable signal, a timer coupled to the possible lockup signal, the timer being started in response to the possible lockup signal, and a second logic gate coupled to the repeating mode logic to reset the repeating mode logic after the timer has elapsed.

In an embodiment, the second logic gate is further coupled to the timer to reset the timer after the timer has elapsed. In an embodiment, the repeating mode logic comprises a state element configured to control signal paths through the repeating mode logic. The second logic gate is coupled to the state element to clear the state of the state element.

In an embodiment, the lockup detection circuit includes a first detection logic gate coupled to input lines of the analog receiver and configured to generate a first idle signal in response to a first mode of the first bus, the first idle signal being coupled to the first logic gate; and a second detection logic gate coupled to the input lines of the analog receiver and configured to generate a second idle signal in response to a second mode of the first bus. The first logic gate is coupled to a mode selector signal and selects the first idle signal or the second idle signal as the idle signal in response to the mode selector signal.

DETAILED DESCRIPTION

Figure 1:
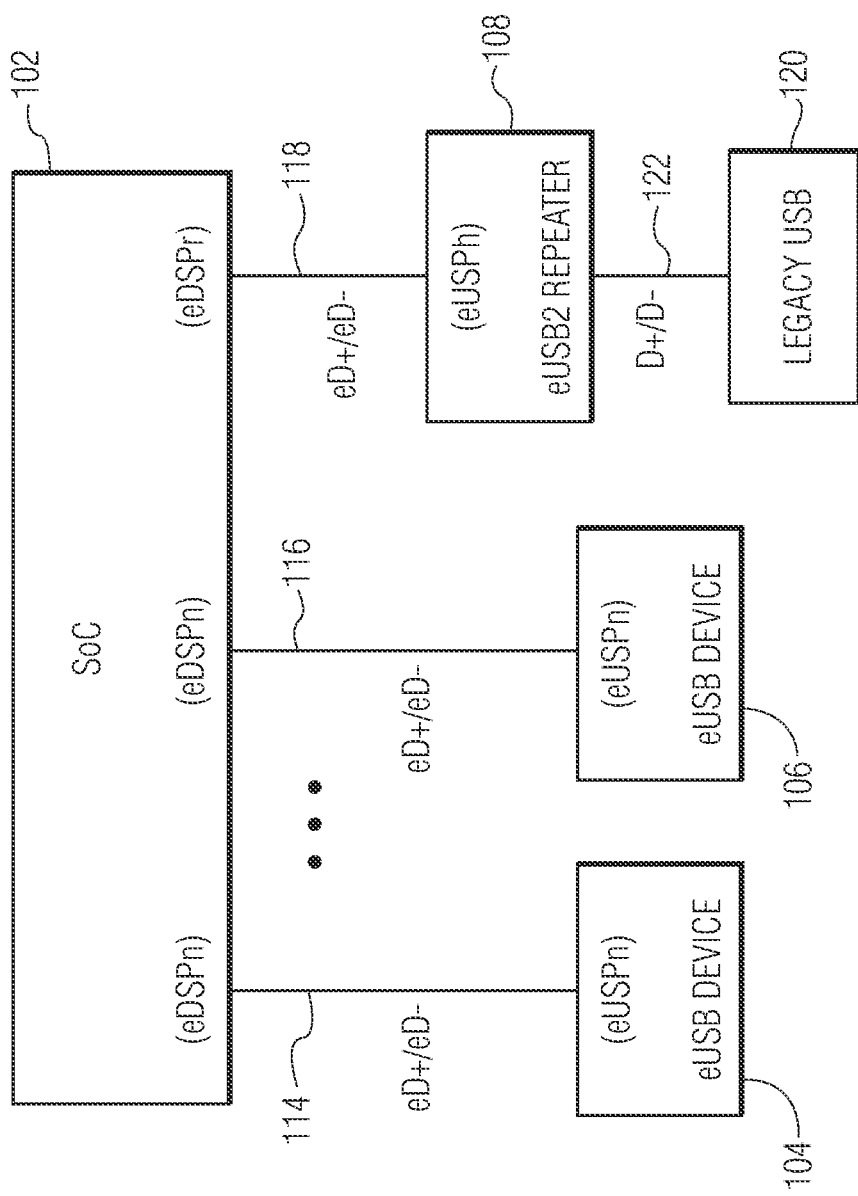
FIG. 1 is a block diagram of a system on a chip (SoC) that is coupled to multiple peripheral devices using eUSB.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Events such as noise, aborted packets, or other unexpected events on the eUSB or USB bus lead, on occasion, to a simple repeater design becoming confused and potentially locking up in a state that prevents the repeater from further operating correctly in the repeating mode. A lockup detection circuit is described herein that provides a small circuit to detect eUSB repeater lockup conditions and provides error recovery to allow correct operation afterwards.

The eUSB2 Specification describes a supplement to USB 2.0 for low voltage, embedded use that operates in all three speed modes of USB 2.0: USB 1.0 Low Speed; USB 1.1 Full Speed; and USB 2.0 High Speed. Low Speed and Full Speed use single-ended signaling in eUSB2, while High Speed (sometimes called Hi-Speed) uses differential signaling in eUSB2. The eUSB2 Specification refers to repeater mode as eUSB2 to USB2 or as USB2 to eUSB2 regardless of the speed mode. In the present description "eUSB" will be used to refer to any modes of eUSB2 or any other suitable single-ended signaling system and "USB" will be used to refer to any modes of USB 2.0 or any other suitable modes of differential signaling. While the present description is presented in the context of Universal Serial Bus structures and methods, the structure and methods herein may be applied to translations between other single-ended and differential signaling systems. While the present description is presented in the context of Low Speed and High Speed mode, the present description may be applied to other modes and to successors of these modes, notwithstanding changes to the naming conventions that are used. It should be noted that USB has been implemented without consistently enforced naming conventions and that even these inconsistent naming conventions may be changed retroactively. Thus, it may happen that "USB 2.0" may soon be referred to primarily as "USB2."

FIG. 1 is a block diagram of a system on a chip (SoC) 102 that is coupled to multiple peripheral devices using eUSB. The SoC 102 is coupled to a first eUSB device 104 through an eUSB connection 114, which may be a single-ended connection in at least some modes. The SoC has a downstream eUSB2 port in native mode (eDSPn). The device has an upstream eUSB2 port in native mode (eUSPn). The eUSB connection 114 between these ports has lines with an eUSB2 data+ pin (eD+) and an eUSB2 data- pin (eD-). The eUSB connection 114 may be through PCB traces, wire lines, or any other suitable internal or embedded connection. An nth eUSB device 106 is coupled through an nth eUSB connection 116.

The SoC 102 is also coupled to one or more legacy USB devices 120. The SOC has a downstream eUSB2 port facing host repeater (eDSPr). That is connected through an eUSB connection 118 to an upstream eUSB2 port of the host repeater (eUSPh) at an eUSB2 repeater 108. The eUSB2 repeater 108 connects through a USB2 connection 122 to one or more legacy USB devices 120.

As shown, the SOC 102 operates in two modes of operation: native mode and repeater mode. The native mode refers to a host port, eDSPn) of the SoC 102 communicating directly to native eUSB devices 104, 106 through a device port, eUSPn, both implementing an eUSB PHY and communicating based on eUSB signaling, for example eUSB2 signaling. Native mode eUSB is particularly suitable for inter-chip interconnect.

Repeater mode refers to an eUSB port, eDSPr, of the SoC 102 communicating with a USB port of a legacy USB device 120 through a repeater 108 that translates between eUSB signaling and USB signaling, for example eUSB2 and USB 1.0, USB 1.1 or USB 2.0 signaling.

Figure 2:
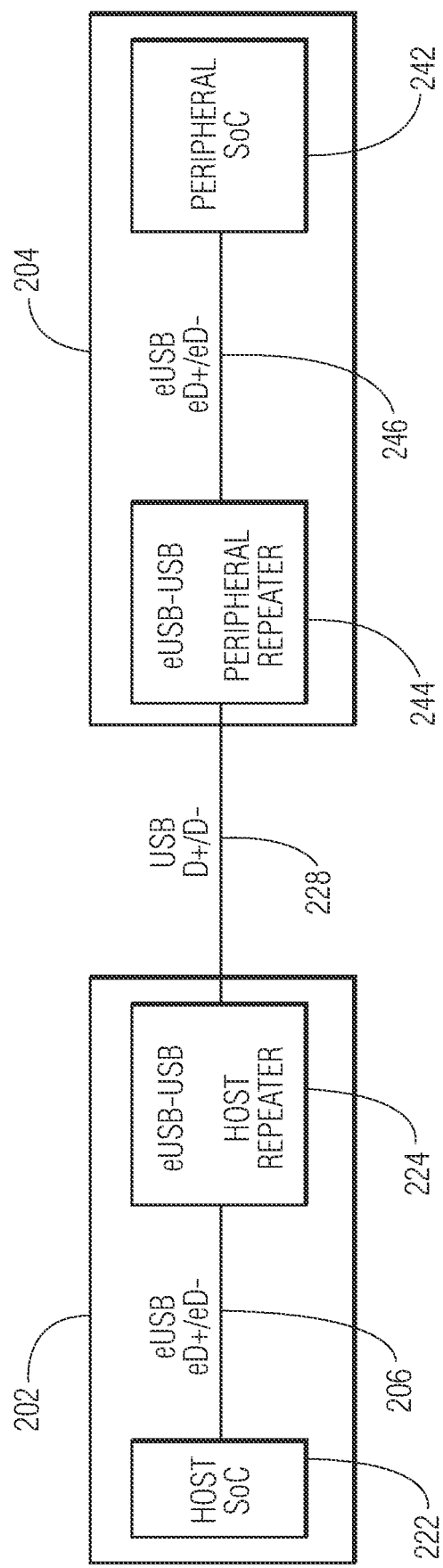
FIG. 2 is a block diagram of a host SoC coupled to a peripheral SoC connected through a USB line, for example a cable or PCB traces.

FIG. 2 is a block diagram of a host SoC 222 coupled to a peripheral SoC 242 connected through a USB line 228, for example a cable or PCB traces. In this example, the host SoC 222 is coupled through an eUSB link 206 with eD+/eD- lines to a host repeater 224. The peripheral SoC 242 is coupled through an eUSB link 246 with eD+/eD- lines to a peripheral repeater 244. The host repeater 224 and the peripheral repeater 244 are connected together using the USB line 228 with D+/D- lines. The host repeater 224 and the peripheral repeater 244 communicate with each other in a repeater mode, indicated as eUSB-USB. This configuration may be suitable for when two eUSB devices are connected through a USB line 228, for example a cable and USB connectors or ports at both sides of the device ports. The host SoC 222 and the peripheral SoC 242 are able to communicate using the lower voltage single-ended signaling that is more suitable for the physical construction of ICs while being connected using the more robust, higher voltage, USB differential signaling through the USB line 228. The host SoC and peripheral SoC may also be coupled to other devices (not shown) in native mode and in repeater mode.

Figure 3:
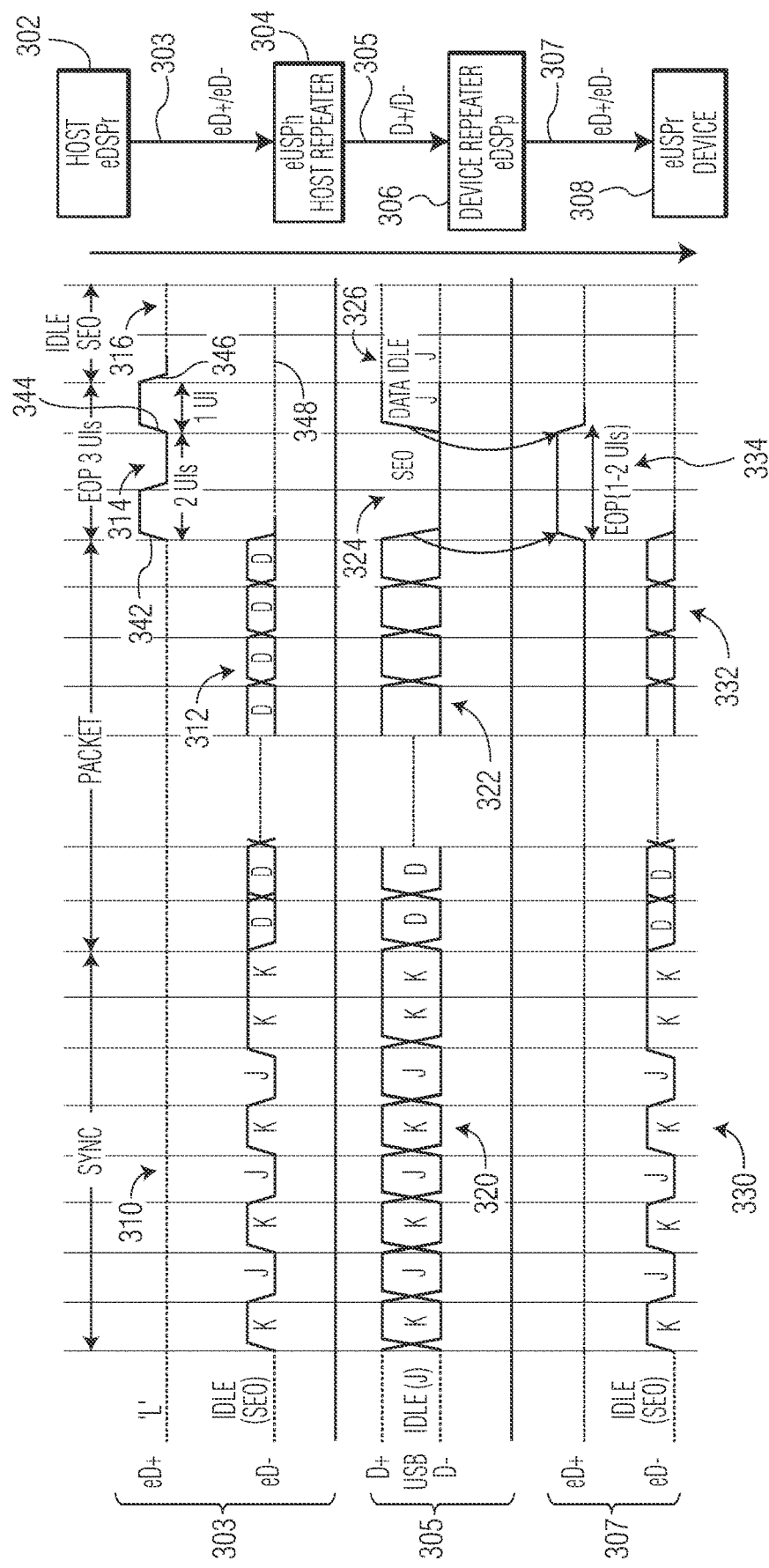
FIG. 3 is a signal timing diagram of a Full Speed packet being sent from an eUSB Host to an eUSB Device through a Host eUSB repeater and a Device eUSB repeater.

FIG. 3 is a signal timing diagram of a Full Speed packet being sent from an eUSB Host 302 to an eUSB Device 308 through a Host eUSB repeater 304 and a Device eUSB repeater 306. Full Speed mode, originally introduced with USB 1.1. is supported as a legacy mode in USB 2.0 and with a few changes from USB 1.1 in eUSB2. The top portion of the signal timing diagram shows the Host side eUSB bus 303, between the eUSB Host 302 and the Host eUSB repeater 304. The middle portion of the signal timing diagram shows the USB bus 305 between the Host eUSB repeater 304 and the Device eUSB repeater 306. The bottom portion of the signal timing diagram shows the Device side eUSB bus 307 between the Device eUSB repeater 306 and the eUSB Device 308.

The eUSB Host 302 initiates a Full Speed packet on the Host side eUSB bus 303. The packet from the eUSB Host 302 is shown on the top portion of the timing signal diagram. The majority of the packet is sent on the eUSB bus eD- signal. The packet starts with the typical USB packet SYNC pattern 310, KJKJKJKK, and then is followed by the normal packet data 312. The packet ends with an End of Packet (EOP) pattern 314, toggling on the eUSB bus eD+ signal.

The middle portion of the timing signal diagram of FIG. 3 shows how the Full Speed packet from the eUSB Host 302 gets translated by the Host eUSB Repeater 304 and generated onto the USB bus 305. The Host eUSB repeater 304 first translates the single-ended signaling on eD- to differential signaling on the USB bus 305. This happens to translate the SYNC pattern 320 and to translate the packet data 322. When the EOP pattern 314 occurs on the host side eUSB eD+ signal, the eUSB Repeater converts that to a USB formatted EOP for the USB bus. The first rising edge on eD+ 342 causes the eUSB repeater to drive an SE0 324 signal (Single-Ended Zero) on the differential lines in which the signal on both lines of the USB bus 305 are low. The second rising edge on eD+ 344 causes the eUSB Repeater to drive the USB bus 305 to a differential data J state 326. The last falling edge on eD+ 346 then causes the eUSB Repeater to tristate the USB bus and let the USB pullup and pulldown resistors hold the bus in an Idle J state. The SE0 324 condition provides a time gap between data packets.

For a digital data line with two voltage states, high and low, a tristate is a third state for which the line is set to a high impedance (high Z) with no particular applied voltage. As a result, any other device connected to the line is able to control the state of the line.

The Device eUSB repeater 306 translates the signals on the USB bus 305 into eUSB single-ended signaling as shown on the Device side eUSB bus 307 on the bottom section of the timing signal diagram. The SYNC pattern 320 on USB bus 305 causes the Device eUSB repeater 306 to drive the device side eUSB eD- line with the SYNC pattern 330. The packet data 322 on the USB bus 305 is translated as a data pattern 332 on the eUSB eD- line. The EOP on the USB bus 305 which is an SE0 324 followed by data J and idle J causes the Device eUSB repeater 306 to drive the eUSB eD+ line high to generate an EOP signal 334 during the USB bus SE0 condition and then low afterwards.

USB Full Speed packets are also sent from the eUSB Device 308 to the eUSB Host 302 through the Device eUSB repeater 306 and the Host eUSB repeater 304. The packet and EOP signals from the eUSB Device 308 are the same as those from the eUSB Host 302 and translated through the repeaters in the same way but in the opposite direction. These signals are defined in the eUSB2 Specification and there is a reciprocity that applies to signals so that they are the same regardless of direction.

While FIG. 3 shows USB Full Speed mode packets in eUSB, USB Low Speed mode is also supported and may be used for packets from the Host to the Device and vice versa. In Low Speed mode the eUSB signals are swapped from how they are sent during Full Speed mode. Instead of using eD− on the single-ended line, it is eD+ which carries the SYNC signal and the packet data. Instead of eD+, it is eD− which carries the packet's EOP signals. Otherwise, the repeaters perform the same functions. The differential signals of the USB signal are the same except with reversed polarity. For example, a Full Speed J is transmitted as D+ being high while D− is low. A Low Speed J is transmitted as D− being high while D+ is low. In repeater mode, also referred to as transparent mode, the repeaters facilitate the passing of packets from each bus to the other bus, converting the single-ended signals to differential signals and vice versa as shown in FIG. 3. At an eUSB Repeater, if eD+ rises before eD−, then this indicates the start of a Low Speed mode packet. If eD− rises before eD+, then this indicates the start of a Full Speed mode packet.

Considering the idle signal 316 from the eUSB Host 302 or conversely from the eUSB Device 308, the single-ended line eD− is driven low for at least a certain duration before the eUSB Host 302 tristates the line eD−. This is shown as a dotted line 348 which extends beyond the diagram. The low state may last for 20-70 ns. In some examples, the line may be driven strongly low for 20-70 ns. After that the line may be tristated with pulldown resistors or some other means holding the value.

On the USB bus 305, there is a string of transitions during the SYNC pattern 320 and the packet data 322. At any of the data bit transitions on the USB bus 305 from J to K or K to J, there may be a period of time during which both of the two input lines D+/D− are low before finally transitioning to the next bit state. This low state is referred to as SE0 (Single-Ended Zero). Instead of a clean J to K transition, the USB bus 305 may, for example, transition from J to SE0 and then from SE0 to K. This SE0 period is supposed to be less than 14 ns for USB Full Speed mode timing and less than 210 ns for USB Low Speed mode timing. An eUSB Repeater 304, 306 translating the packet from USB to eUSB filters out the temporary SE0 conditions.

The operation of the repeater may be summarized as facilitating the passing of packets from each bus to the other bus, converting the single-ended packets to differential packets and the differential packets to single-ended packets. In order to provide small, fast, low-cost repeaters that can still parse the structure of the packets, state machines or simple logic architectures may be used. However, if there is noise on one of the busses, then these state machine-based designs may parse the input signal as a SYNC bit and enable the other side of the repeater to pass the packet through. If only noise was received, the eUSB repeater will not receive more signaling which looks like a packet. Therefore, it may get stuck. Another situation which could happen is if the host or device (or USB2 hub) aborts a packet transmission for some reason. This is not expected, but if it does occur then the same error condition could occur. The eUSB repeater may have received packet SYNC bits and some amount of data, but never receives the packet EOP. The repeater will be stuck waiting for the EOP signal, all while still driving the destination bus. If the repeater gets in a stuck state, then it cannot facilitate further packet delivery and may cause contention on one of its busses that is stuck in a driving state while another device may want to drive data.

The described Lockup Detection circuit allows state-based eUSB repeater PHY designs to recover from unexpected error conditions on the eUSB or USB2 buses which may look like packet data. Examples are noise on either bus or partially sent packets which are aborted before the EOP is sent. The Lockup Detection circuit senses enable signals to determine when the repeater is enabling the eUSB transmitter for a prolonged time while the USB2 bus receiver is set to an idle J or when the USB2 transmitter is enabled for a prolonged time while the eUSB bus is idle, for example in an SE0 condition. When the time is too long a lockup condition is declared and the internal state flip-flops in the eUSB to USB2 Repeating Mode Logic and in the USB2 to eUSB Repeating Mode Logic are reset. While flip-flops are described and shown, any other type of state machine may be used. Resetting the eUSB repeater may be performed by applying reset signal to the state elements of the eUSB repeater that control the signal paths through the repeater. The Lockup Detection circuit may modify the detection approach when the repeater is in full speed or low speed modes.

In operation, for incoming eUSB packets, the repeater will look for the start of a packet as the presence of the first SYNC bit of the SYNC pattern and enable the other side of the eUSB repeater, the USB2 full speed driver, to pass the incoming packet from eUSB to USB2. The drivers will then pass the SYNC bits and packet data carried on the eUSB data line (eD− for full speed mode and eD+ for low speed mode) to the USB2 bus. Once the end of the packet arrives on the eUSB control line (eD+ for full speed mode and eD− for low speed mode), then the repeater will use the first portion of the EOP (high going pulse on eUSB control line followed by low period) to drive an SE0 condition on the USB2 bus. The repeater then uses the end of the EOP (second high going pulse on eUSB control line) to drive the USB2 bus to a data J condition before releasing the bus.

In the reverse direction from USB2 to eUSB. The repeater uses the same strategy to pass packets from USB2 to eUSB converting from differential signaling to single ended signaling. First the USB2 SYNC bit is detected at the start of the incoming USB2 packet then the eUSB data line is enabled to convert the differential SYNC bits and packet data bits from USB2 to single ended signaling on the eUSB data line. When the SE0 of the EOP is received on the USB2 bus, the eUSB control line can be driven high. Lastly when the EOP ends on the USB2 side, the eUSB lines may be released.

Since the repeater is looking for a very precise and specific behavior, the repeater may lock up any time that the input signal in either direction does not match specific patterns. As a first example, consider a host packet that is aborted during the SYNC or packet data part. When the eUSB repeater sees only the first few SYNC bits, it may get stuck in a state where the host side repeater is driving the USB bus with the FS/LS driver and the device side repeater is stuck in a state driving the eUSB bus eD− (for FS mode). The repeater may be unstuck when a port reset occurs, or when the host sends another packet. The host repeater should unlock as soon as the next packet has its EOP; this should also free up the device side repeater. The same may apply when there is high noise on the eUSB bus or when a packet is aborted on the USB receive bus.

As a second example, consider noise on the host side eUSB bus that causes both repeaters to lock up, and during this lockup condition the device starts sending a packet to the host. Since the device repeater is locked up in the USB to eUSB direction, it will be stuck driving eD− but will not drive USB. Since the host repeater is locked up, it is driving USB to active J. Using the lockup detection circuit herein, the repeaters will eventually be reset. After the device repeater is reset, it will start transmitting the device packet to the host, although the packet will be incomplete since it missed the start of the packet.

Figure 4:
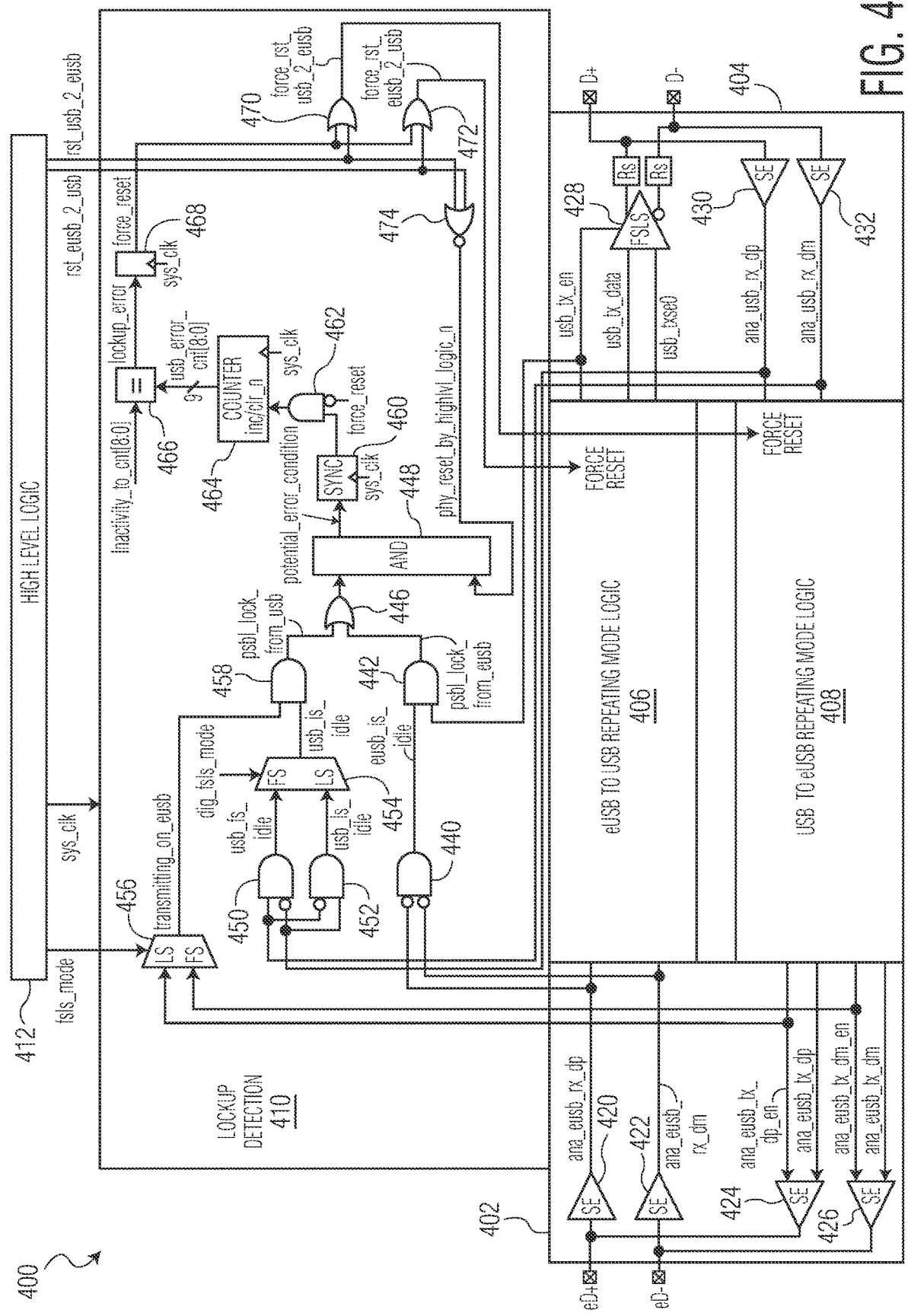
FIG. 4 is a block diagram of a lockup detection circuit in the context of a repeater.

FIG. 4 is a block diagram of a lockup detection circuit 410 in the context of a repeater 400, for example any single-ended to differential repeater or any eUSB to USB repeater. The repeater 400 has a eUSB transceiver 402 with a dp single-ended receiver output driver 420 to generate a received dp signal ana_eusb_rx_dp and a dm single-ended receiver output driver 422 to generate a received dm signal ana_eusb_rx_dm. In repeater mode, the receive signals are provided to an eUSB to USB Repeating Mode Logic 406 which provides, in response, transmit signals to a differential transceiver 404. The transmit signals are usb_tx_data, that carries the data as described above, and usb_txse0, that provides EOP and SE0 information as shown in FIG. 3. An enable signal, usb_tx_en is also provided, and all three are coupled to a transmitter output driver 428 of the differential transceiver 404. The transmitter output driver 428 generates differential signals for the USB bus as described above.

Referring to FIG. 4, the differential transceiver 404 has a dp single-ended receiver output driver 430 to generate a received dp signal ana_usb_rx_dp and a dm single-ended receiver output driver 432 to generate a received dm signal ana_usb_rx_dm. Both of these signals are provided to a USB to eUSB Repeating Mode Logic 408 which provides, in response, transmit signals to the eUSB transceiver 402. The transmit signals are data and enable signals for single-ended transmitter output drivers. A dp transmitter output driver 424 receives an eD+ signal, ana_eusb_tx_dp and a corresponding enable signal ana_eusb_tx_dp_en. A dm transmitter output driver 426 receives an eD− signal, ana_eusb_tx_dm and a corresponding enable signal ana_eusb_tx_dm_en.

The signals at the eUSB transceiver 402 and at the differential transceiver 404 are monitored by the lockup detection circuit 410. When a lockup is detected, then the lockup detection circuit 410 sends a force reset signal to the respective repeating mode logic or both. In addition, high level logic 412 is coupled to the lockup detection circuit 410 and to other parts of the repeater 400 (not shown). For the eUSB to USB Repeating Mode Logic 406, the Lockup Detection circuit 410 may receive a rst_eusb_2_usb signal from the high level logic 412 at a reset OR gate 472 or a force_reset signal generated by the lockup detection circuit 410. If either of these are high, then the reset OR gate 472 generates a force_rst_eusb_2_usb signal to the eUSB to USB Repeating Mode Logic 406. In a similar way for the USB to eUSB Repeating Mode Logic 408, the Lockup Detection circuit 410 may receive a rst_usb_2_eusb signal from the High Level Logic 412 at a reset OR gate 470 or the force_reset signal generated by the lockup detection circuit 410. If either of these are high, then the reset OR gate 470 generates a force_rst_usb_2_eusb signal to the USB to eUSB Repeating Mode Logic 406. Note that the same force_reset flag is an input to both of the OR gates 470, 472 so that both directions of the repeater receive the force reset signal if there is a lockup detected in either direction.

The lockup detection circuit 410 receives the receive and transmit signals from the transceivers and is able to determine whether the repeater is transmitting an output signal in either direction without receiving a corresponding input signal. The received input signals are applied to the center left side of the lockup detection circuit 410 and the transmitted output enable signals are applied to the upper and lower left side of the lockup detection circuit 410. These are compared over a selected delay time to generate the force_reset signal.

In particular, on the eUSB translator side, the inverse of the received eUSB signals ana_eusb_rx_dp and ana_eusb_rx_dm are applied from the single-ended analog transceiver to an eUSB received logic gate 440, in this case an AND gate so that if the eD+ and eD− are both low, then no data is being received on eUSB and the eUSB received logic gate 440 generates an idle signal eUSB is idle. This corresponds to an idle period, such as an SE0 period or a transmission failure period. The failure may happen when the eUSB sender, e.g., the host, aborts a packet. For the corresponding transmit side, the enable signal, usb_tx_en, for the transmitter output driver 428 may be used to determine whether data is being transmitted on USB at D+ and D−. This enable signal is provided to an eUSB lockup logic gate 442, in this case an AND gate together with the idle signal, el/SB is idle. If there is no received data and the transmitter output driver 428 is enabled, then there is possibly a lockup on the eUSB repeater side of the repeater 400. The eUSB lockup logic gate 442 generates a psbl_lock_from_eusb signal 526.

For the USB translator side, the received USB signals ana_usb_rx_dp and ana_usb_rx_dm are applied to respective USB detection logic gates 450, 452. Due to the nature of the differential signals on the USB bus, a first fs detection logic gate 450, e.g., an AND gate, receives the D+ signal, ana_usb_rx_dp, and the inverse of the D− signal, ana_usb_rx_dm. If the output of the D+ and the inverse of the D− are both high, then, according to the function of the AND gate, the first fs detection logic gate 450 generates a first idle signal to indicate that the receive side of the USB bus is idle as detected in full-speed mode, usb_fs_is_idle. A second ls detection logic gate 452, e.g., an AND gate, receives the D− signal, ana_usb_rx_dm, and the inverse of the D+ signal, ana_usb_rx_dp. If the output of the D− and the inverse of the D+ are both high, then, according to the function of the AND gate, the second ls detection logic gate 452 generates a signal to indicate that the receive side of the USB bus is idle as detected in low-speed mode, usb_l-s_is_idle.

The output of the first FS detection logic gate 450 and the second LS detection logic gate are both applied to a logic gate 454 together with a mode selector signal, dig_fsls_mode, from the high level logic 412 to generate an idle signal usb_is_idle, when the active mode, fs or ls, is idle. The logic gate 454 selects either the first idle signal or the second idle signal as the output usb_is_idle signal in response to the selector signal, dig_fsls_mode.

For the corresponding transmit side, there is an enable signal for eD+ and eD− signals applied to the transmit output drivers 424, 426 for eUSB. The enable signal, ana_eusb_tx_dp_en, for the for dp transmit output driver 424 and the enable signal, ana_eusb_tx_dm_en, for the dm transmit output driver 426 are both applied to an eUSB enable logic gate 456 together with the mode input, dig_fsls_ mode, signal from the high level logic 412. The output signal transmitting_on_eusb is coupled to a USB lock gate 458. If the usb_is_idle signal and the transmitting_on_eusb signal are both high at the USB lock gate 458, then there is possibly a lockup condition on the USB repeater side and the USB lock gate 458 generates a psbl_lock_from_usb signal. The psbl_lock_from_usb signal indicates that there is no received data and yet the transmitter output drivers 424, 426 are enabled.

The lockup detection circuit monitors when the transmit or output side of the bus is being actively driven but the receive or input side is idle. If this lasts longer than some predetermined amount of time, for example 10 Low Speed unit intervals (UI), then a lockup condition is declared and force reset signal is sent to the repeating mode "eUSB to USB" and "USB to eUSB" logic. These are then reset in some way to clear the lockup condition. In some embodiments, there are flip-flops in the logic that are cleared by the force reset signal. The logic then starts over from an initial state. The force reset signal resets flip-flops or any other state elements that control the signal paths through the repeater in the eUSB to USB logic and the USB to eUSB logic.

Figure 5A:
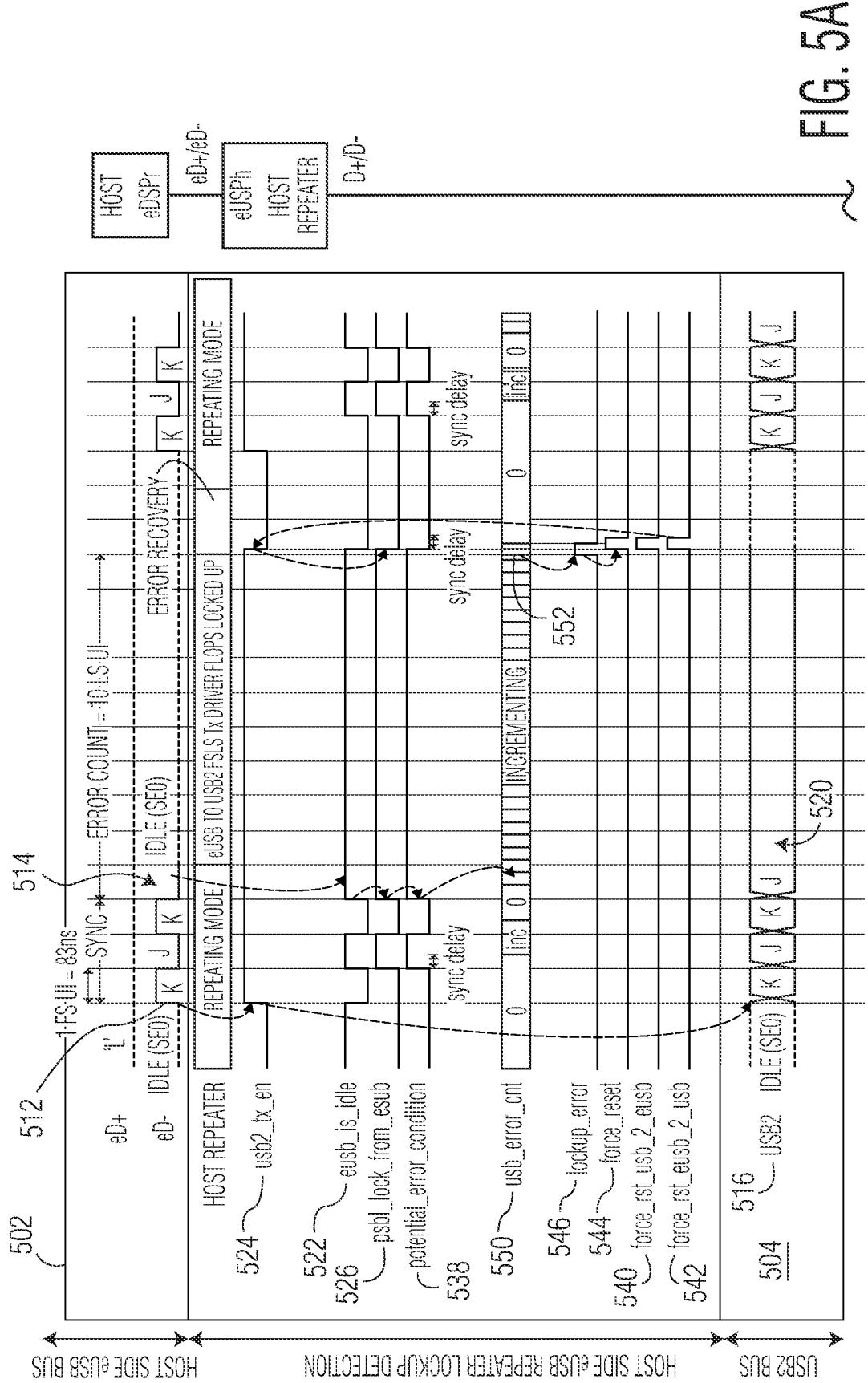
FIG. 5A is a timing signal diagram of an error on a host eUSB bus causing a lockup and a reset on a USB bus.
Figure 5B:
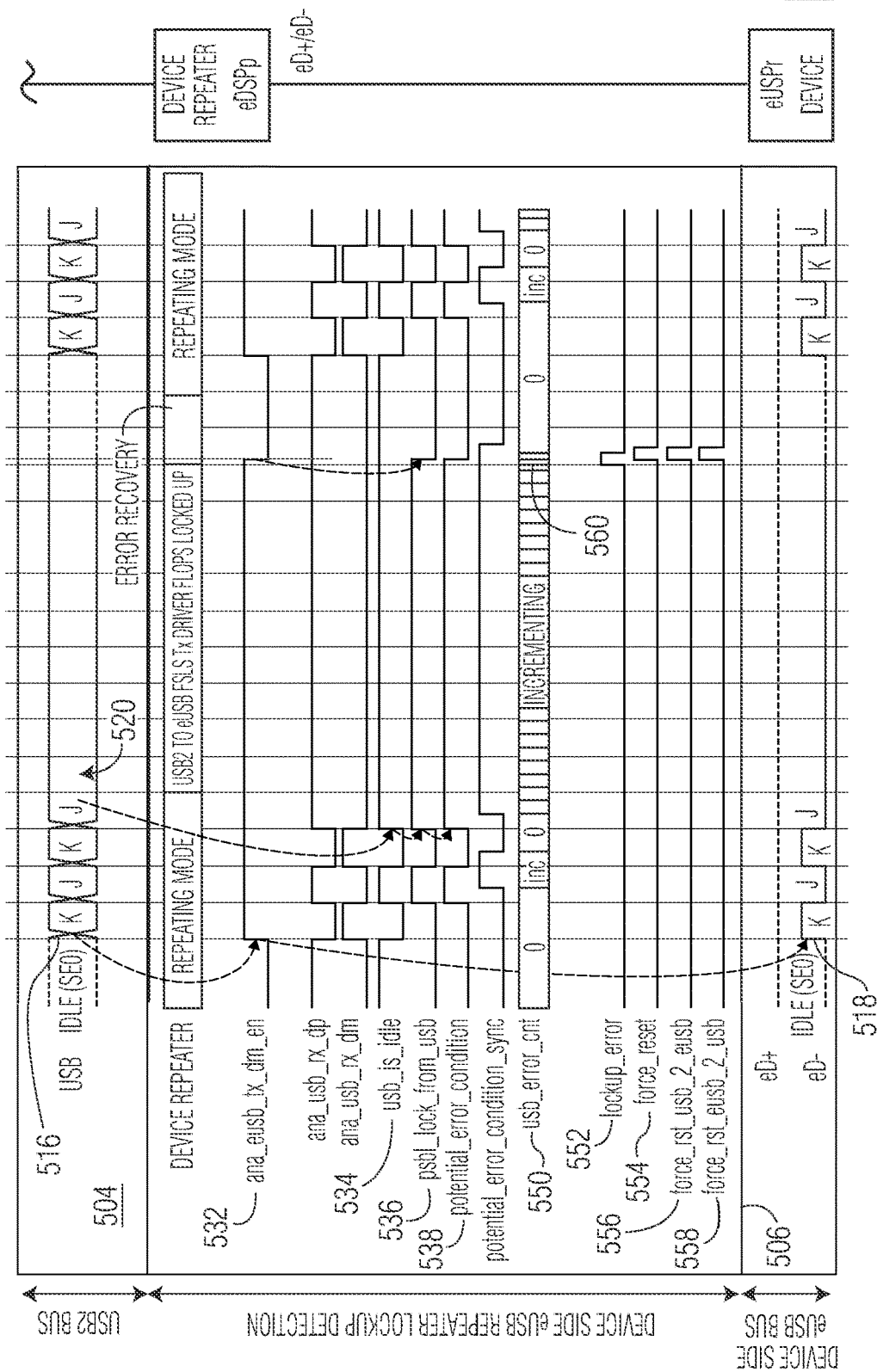
FIG. 5B is a timing signal diagram of an error on a USB bus causing a lockup and a reset on a device side eUSB bus.

FIG. 5A is a timing signal diagram of an error on a host eUSB bus causing a lockup and a reset on a USB bus. FIG. 5B is a timing signal diagram of an error on a USB bus causing a lockup and a reset on a device side eUSB bus. The eUSB bus 502 signals are represented on eD+ and eD−. The USB bus 504 signals are differential and are represented by two lines with opposite polarity. The signals on the signal lines of FIG. 4 are shown on the signal timing diagram of FIGS. 5A and 5B.

Referring to FIG. 5A, in operation, the first activity 512 for FS mode is on the eD− line of the host side eUSB bus 502 at the eUSB analog transceiver which is the eUSB transceiver 402. In LS mode, the first activity will be on the eD+ line of the host side eUSB bus 502. In response, the host side eUSB repeater immediately enables its USB side driver, the transmitter output driver 428, with the usb_tx_en signal 524 to pass the eUSB activity to the USB bus 504 through the USB analog transceiver which is the differential transceiver 404. This is shown by the usb_tx_en signal 524 going high and the USB bus transitioning 516 with the data.

If, after a few bits, the host aborts 514 the packet on the eD− line and releases the eUSB bus 502, then the host side repeater continues to drive the USB bus even after the host aborts its packet transmission. The lockup detection circuit 410 monitors the state of the USB bus as well as the state of the eUSB bus. Since the input eUSB bus 502 is idle due to the aborted packet, but the USB bus is still being driven by the repeater, then the lockup detection logic detects this as a potential lockup. The eusb_is_idle signal 522 combines the eUSB eD+ and eD− input states to determine when the eUSB bus is idle, for example in an SE0 state. The psbl_lock_from_eusb signal 526 is generated by the logic based on looking at this as well as the USB transmit drivers to determine when there is a possible lockup.

In the illustrated embodiment, a usb_tx_en signal 524 is used to detect whether the logic is attempting to drive data on the USB bus 504 at the USB transceiver. In other logic configurations, a different signal may be used to detect whether the logic is attempting to drive data on the USB bus. As a further alternative, the state of the USB bus may be monitored, for example a state at the output terminals D+, D−.

Referring to FIG. 5B, on the device side with the first activity of the bus transitioning 516 on the USB bus 504, the device side eUSB repeater immediately enabled its eUSB side driver to pass the USB activity to the eUSB bus 506 (driving eD−). This is shown by the ana_eusb_tx_dm_en signal 532 going high and the eUSB bus transitioning 518 with the data. But with an aborted packet, the USB bus is left in a prolonged J state 520 after only a few bits. The device side repeater watches the state of the eUSB bus 506 (the device side repeater is driving the eUSB bus even after the host aborts its packet transmission) as well as the state of the USB bus 504. Since the input bus is idle due to the aborted packet when the host aborts 514 but the eUSB bus is still being driven by the repeater, then the lockup detection logic detects this as a potential lockup. The usb_is_idle signal 534 combines the USB D+ and D− input states to determine when the USB bus is idle, for example stuck in a prolonged J state 520. The psbl_lock_from_usb signal 536 is based on receiving the usb_is_idle signal 522 as well as the eUSB Tx driver signals to determine when there is a possible lockup state.

The two possible lockup signals, the psbl_lock_from_eusb signal 526 and the psbl_lock_from_usb signal 536, are both connected to an OR gate 446, the output of which is coupled to a reset test AND gate 448. If either or both signals are high, then a high value is applied to the AND gate. The second input is a reset signal from the high level logic 412. If the high level logic is not driving a reset or any other suitable activity, then the reset test AND gate 448 generates a potential_error_condition signal 538. The high level logic 412 may generate a rst_eusb_2_usb signal, rst_usb_2_eusb signal, or another signal that is applied through an OR gate 474 and inverter to prevent the potential_error_condition signal 538. In this way the high level logic preempts any action that is taken or commanded by the lockup detection circuit.

The potential_error_condition signal 538 is synchronized at a sync logic device 460. The sync logic device 460 may take any of a variety of different forms, for example back-to-back flip-flops. The sync logic device 460 is coupled to the reset test AND gate 448 to allow use by a counter 464. A force reset logic gate 462 is coupled to the force_reset flag 554 and resets the counter 464 for a force reset. During the time when the USB bus is driven by the host side eUSB repeater but the input eUSB lines are both low, the potential_error_condition signal 538 is high. The potential_error_condition signal indicates a possible lockup from the USB bus or the eUSB bus or both and the counter is started in response to the possible lockup signal. Upon beings started the counter 464 increments. The incrementing counter 550 increments up to reach a pre-configured count stored in a threshold register 466, e.g., 10 UI. The counter 464 and the threshold register 466 form a timer. The timer duration is determined by the threshold register 466. If the eUSB bus becomes a non-SE0 state, then that implies packet activity and so the counter 464 is cleared to get ready for the next potential lockup condition. If the lockup condition persists and the incrementing counter 550 has incremented to reach the pre-configured count stored as a timeout value or timer duration in the threshold register 466 connected to the counter 464, then the timer has expired and a lockup_error flag 552 is asserted by the threshold register 466 as the timer output. The lockup_error flag 552 is coupled to a reset flip-flop 468 to register the lockup_error flag 552 and create a force_reset flag 554. The threshold for the counter may be set based on the operation of the signaling protocols and the repeater. In some embodiments, the threshold value provides at least 10 Low Speed UI worth of lockup condition.

The reset flip-flop 468 is registered to provide the force_reset flag 554 for a predetermined amount of time. In some embodiments, the reset flip-flop 468 is also connected to a system clock, sys_clk, to count some number of clocks worth of reset. Once the force_reset flag 554 is asserted, then both the force_rst_usb_2_eusb signal 556, and the force_rst_eusb_2_usb signal 558 are asserted and routed to the repeating mode logic of the repeater to reset any flip-flops or other state elements in those circuits to unstick the lockup condition. The two force_reset signals the force_rst_usb_2_eusb signal 556 and the force_rst_eusb_2_usb signal 558 are received at the USB to eUSB Repeating Mode Logic 408 and the eUSB to USB Repeating Mode Logic 406, respectively.

The force_reset 554 from the reset flip-flop 468 is connected to three different logic gates 470, 472, 474. The first logic gate is a reset OR gate 470 that is also coupled to the rst_usb_2_eusb signal from the high level logic 412. If this signal is high, then a reset is already in progress and the force_reset signal is not sent to the USB to eUSB Repeating Mode Logic 408. The second logic gate is a reset OR gate 472 that is also coupled to a rst_eusb_2_usb signal from the high level logic 412. If this signal is high, then a reset is already in progress and the force_reset signal is not sent to the eUSB to USB Repeating Mode Logic 406.

After the force_reset flag 554 is asserted the counter 464 may be cleared at 560. At this point in time, the lockup condition is resolved, the detection circuit is ready to detect future lockup conditions, and the repeater is ready to process future packets from either side of the repeater.

While the possible lock up condition signals, the psble_lock_from_usb signal 536, and the psble_lock_from_eusb signal 526, are routed together through an OR gate 446 to the reset test AND gate 448, this is not required. The counter and threshold tests may be made independent and each generate an independent force_reset. As an example, a psbl_lock_from_usb signal 536 may be applied to a counter and if a lock is determined then only a force_reset_usb_2_eusb signal 542 is generated. The counter 464 or the threshold register 466 may also be changed based on the Full Speed or Low Speed mode. The signals may be re-routed or the operations changed in response to the mode, for example in response to the fsls_mode signal.

As described above, the lockup detection circuit is able to catch a potential lockup while not interfering with normal operation. The operation is fast but not so fast as to declare a normal packet as an error condition. The operation is tolerant of resumes, wakes, and disconnects. The repeater is in non-repeating mode during wake and resume, and even if the repeater uses repeating mode for some reason in the transition from wake or resume to L0, resume still has an EOP signal at the end. So, any possible stuck condition would probably correct itself due to the nature of the end of resume signaling. In a similar way the lockup detection circuit is tolerant of Control Messages and RAP and is configured to support LS Keep Alive message.

The lockup detection circuit takes bit stuffing into account. With bit stuffing, static data is sent for up to 6 bit times. The 7th bit should always be a different bit. In FS mode bit stuff errors may be forced in some circumstances. As an example, 7 binary "1" bits may be sent in a row with no line state change for 7 bits without bit stuffing followed by an FS EOP. This looks to the logic like 7 bit times of static data. Accordingly, the counter 464 of the lockup detection circuit may be configured to consider at least 8 bits of static data before declaring an error condition.

The lockup detection circuit also takes into account that Low Speed packets may occur even during Full Speed mode. This occurs when there is a low Speed device beneath a Full Speed hub. In this case the Full Speed hub passes the Low Speed packets to and from its Full Speed USB bus with Low Speed timing but with Full Speed polarity and Full Speed drivers.

Figure 6:
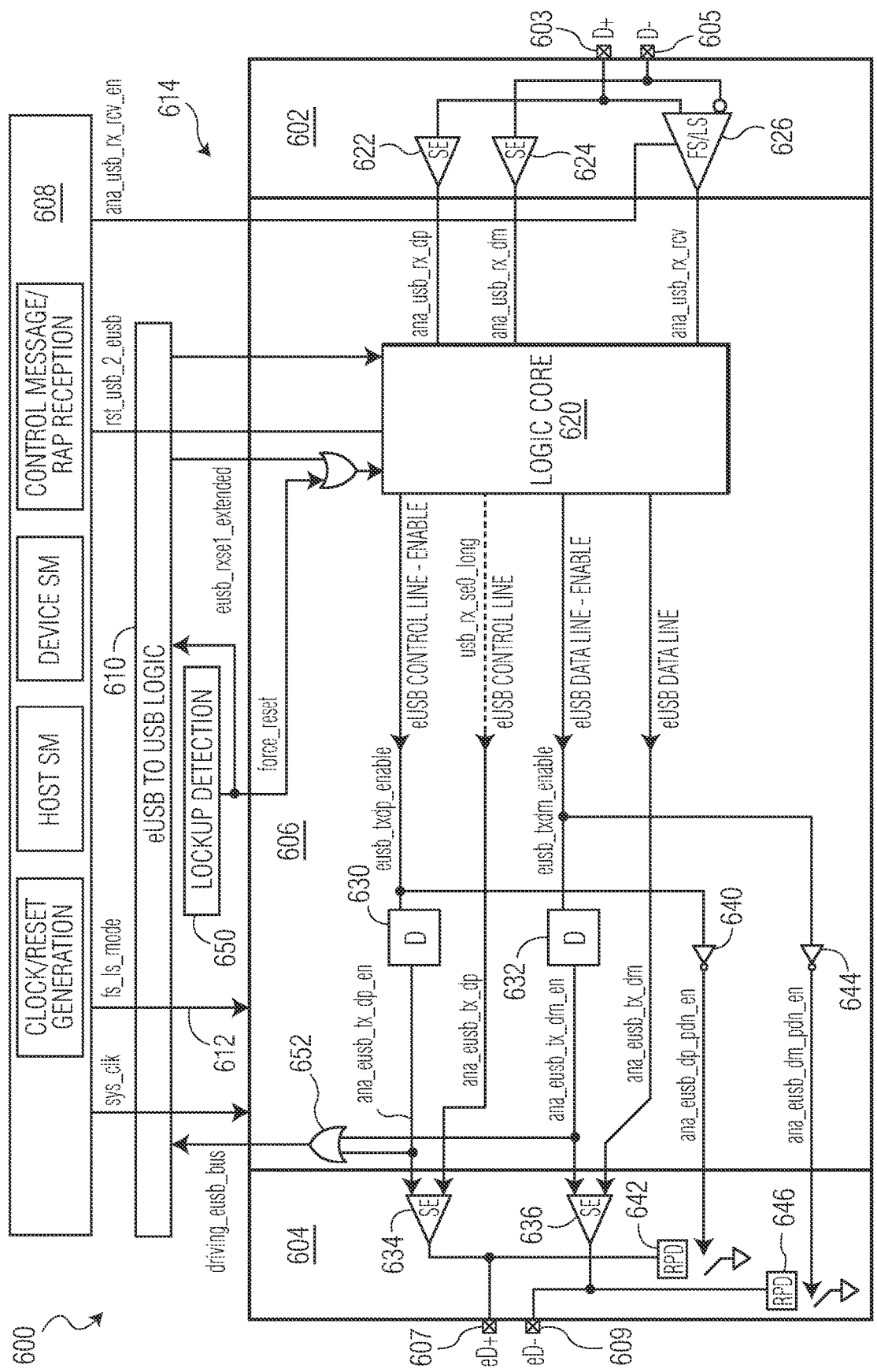
FIG. 6 is a block diagram of a repeater for use in converting differential signaling on a USB bus to single-ended signaling on an eUSB bus.

FIG. 6 is a block diagram of a repeater for use in converting differential signaling on a USB bus to single-ended signaling on an eUSB bus. The repeater 600 may be used with the lockup detection circuit 410 described above and provides an example of how a force reset signal may be used to reset a repeater. The lockup detection circuit 410 may alternatively be used with a variety of other repeater configurations. The illustrated repeater 600 is provided as one of many possible examples. The illustrated configuration of the repeater 600 is for Full Speed mode on eUSB and USB. For Low Speed mode, the data and control lines are reversed. An fs_ls_mode signal from high level logic 608 may be used to cause the repeater to reverse the data and control lines and make any other suitable configuration changes. The mode may be determined in an initial setup or configuration operation. The repeater 600 has USB to eUSB logic 614 with an analog USB receiver 602 with a D+ input port 603 and a D− input port 605. Power and other signals of the USB bus are routed to other parts of the system. The USB to eUSB logic 614 has an analog eUSB transmitter 604 with an eD+ output port 607 and an eD− output port 609 for eUSB signaling. Digital logic 606 of the USB to eUSB logic 614 connects the analog USB receiver 602 to the analog eUSB transmitter 604.

The digital logic 606 is coupled to high level logic 608. The high level logic 608 may include logic to handle non-repeating mode operations such as clock/reset generation, Host state machine (SM), Device SM, control message handling and register access protocol (RAP) reception. The control functions may include circuit startup, connection, suspend, resume, wake, bus reset, port reset detection, etc.

The digital logic 606 is also coupled to eUSB to USB logic 610 for processing eUSB to USB packets. The eUSB to USB logic 610 performs a similar function as the USB to eUSB logic 614. In the case of Full Speed and Low Speed modes, those functions include an analog USB receiver, digital logic, and an analog eUSB transmitter operating in the opposite direction and translating data signals from eUSB to USB. There are two signals coupled with this logic, a driving_eusb_bus signal and a driving_usb_bus signal. The driving_eusb_bus signal is an indication from the USB to eUSB logic that it is processing a packet from the USB bus and passing it to the eUSB bus. When this is true, this causes the eUSB to USB logic 610 to ignore the activity it sees on the eUSB bus. The driving_usb_bus signal is an indication to the USB to eUSB logic 614, in particular the digital logic 606, that a packet is being passed from the eUSB bus to the USB bus and so the USB to eUSB logic 614 should not act on USB bus activity.

A lockup detection circuit 650 is also coupled to the digital logic 606 of the USB to eUSB logic 614 and to the eUSB to USB logic 610. The lockup detection circuit 612 detects when a failure has occurred and generates a force_reset signal to the logic core 620 of the digital logic 606. The force_reset signal causes a reset as described in more detail below. The reset allows the USB to eUSB logic 614 and the eUSB to USB logic 610 to come out of the lockup condition to start repeating data packets again. In one example, the force_reset signal causes flip-flops associated with maintaining states on the data and control lines to be reset. This causes the repeater to tristate the eUSB and USB data lines.

The analog USB receiver 602 converts the differential USB Full Speed mode signaling and Low Speed mode signaling into eUSB signaling for application to the digital logic 606. The analog USB receiver 602 has a D+ output driver 622 that is coupled to the D+ input port 603 and a D− output driver 624 that is coupled to the D− input port 605. The D+ output driver 622 and the D− output driver 624 are connected to the digital logic of the logic core 620. The D+ output driver 622 generates a dp (D positive) signal labeled as the ana_usb_rx_dp signal and the D-output driver 624 generates a dm (D minus) signal labeled as the ana_usb_rx_dm signal. In addition, the receiver output drivers convert the voltage of the USB data signal to a lower voltage for the eUSB data signal.

Typically, in use the eUSB input, the ana_usb_rx_rcv signal, is high whenever D+ at the D+ input port 603 is greater than or equal to D− at the D− input port 605. For Full Speed mode, this means that a J condition (D+ high, D− low) results in the output of the analog USB receiver as "1" and that a K condition (D− high, D+ low) results in the output being "0." For Low Speed mode this means that a J condition (D− high, D+ low) results in the output of the analog USB receiver being "0" and that a K condition (D+ high, D− low) results in the output being "1." A USB receiver 626 receives the USB input signals from the D+ port 603 and inverted from the D− port 605 and an enable signal, the ana_usb_rx_rcv_en signal, from the high level logic 608. The USB receiver 626 then generates an eUSB data signal, the ana_usb_rx_rcv signal, that is connected to the logic core 620. The analog USB receiver 602 also maintains its previous state in the event an SE0 is present on the USB bus.

The digital logic 606 includes a logic core 620 that receives the output signals from the analog USB receiver 602. These signals are the ana_usb_rx_dp signal, the ana_usb_rx_dm signal, and the ana_usb_rx_rcv signal. Using these output signals as input signals to the logic core 620, the logic core 620 generates an eUSB Control Line output signal, an eUSB Data Line output signal and enable signals for each output, an eUSB Control Line Enable signal, and an eUSB Data Line Enable signal. For Full Speed mode, the eUSB Control Line output signal is coupled to an eD+ output driver 634 of the analog eUSB transmitter 604 that drives the eD+ signal at the eD+ output port 607. The eUSB data line output is coupled to an eD− output driver 636 of the analog eUSB transmitter 604 that drives the eD− signal at the eD− output port 609. For Low Speed mode, the polarity is reversed. The output drivers convert the voltage of the eUSB data line to the higher voltage or the lower voltage for the eUSB, if necessary.

When the repeater 600 stops driving either eD+ or eD−, it first drives the respective line low for 20-70 ns before releasing it. In some embodiments, a delay cell 630 is used which transmits the eUSB Control Line Enable signal when it occurs and continues until the end of a delayed interval, for example for 20-70 ns. The delay cell 630 output is coupled to the eD+ output driver 634 so that the eD+ output driver 634 is enabled as long as the delay cell 630 is high. When enabled, the eD+ output driver 634 drives the eD+ output port 607 with the eUSB Control Line signal.

A second delay cell 632 is coupled to the eUSB Data Line Enable signal in the same or a similar way so that the delay cell 632 transmits the eUSB Control Line Enable signal when it occurs and continues until the end of the delay, for example for 20-70 ns. The second delay cell 632 output is coupled to the eD− output driver 636 so that the eD− output driver 636 is enabled as long as the second delay cell 632 is high. When enabled, the eD− output driver 636 drives the eD− output port 609 with the eUSB Data Line signal.

The digital logic 606 also connects the eUSB Control Line Enable signal to an inverter 640 and a switched pulldown resistor 642. The switched pulldown resistor 642 is coupled to the eD+ output port 607 when the eUSB Control Line Enable signal is low to pull down the eD+ output port when there are no Control signals being driven by the eUSB repeater on the Control Line Enable. Similarly, the eUSB Data Line Enable signal is connected to an inverter 644 and a switched pulldown resistor 646. The switched pulldown resistor 646 is coupled to the eD− output port 609 to pull down the eD− output port when the eUSB Data Line enable signal is low which is when there are no data signals being driven by the eUSB repeater on the eUSB Data Line. The enable signals for the eUSB pulldown resistors 642, 646 on the eD+ and eD− lines are labeled as the ana_eusb_dp_pdn_en signal and the ana_eusb_dm_pdn_en signal, respectively.

The digital logic 606 also connects the eUSB Control Line Enable signal and the eUSB Data Line Enable signal as inputs to a logic gate 652, for example an OR gate. The OR gate 652 output indicates whether either signal is high and this output is provided to the eUSB to USB logic 610. This provides an indication that the repeater 600 is currently passing an incoming USB packet to eUSB.

Figure 7:
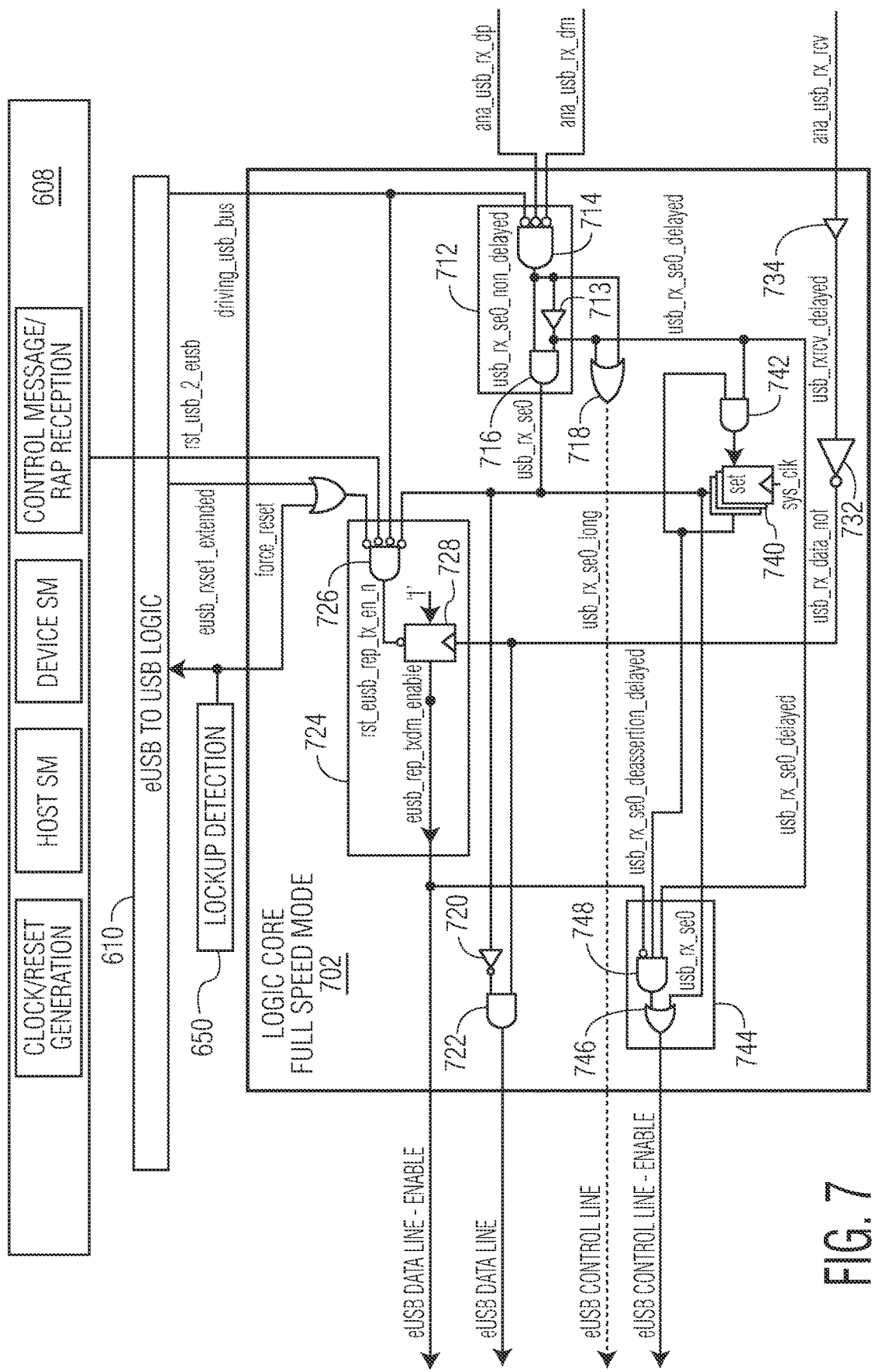
FIG. 7 is a block diagram of a logic core suitable for use as the logic core 620 of the repeater for Full Speed (FS) mode.

FIG. 7 is a block diagram of a logic core 702 suitable for use as the logic core 620 of the repeater 600 for Full Speed (FS) mode. As described above, the eUSB Data Line carries the single-ended translation of the data from the analog USB receiver 602 that provides the ana_usb_rx_rcv signal for data detection from the analog USB receiver 602 to the analog eUSB transmitter 604. The analog USB receiver also provides the ana_usb_rx_dp signal and the ana_usb_rx_dm signal for detection of EOP. During Full Speed mode, the data is received in inverted form. A USB "J" comes in as a "1" and so the signal is inverted to translate to the eUSB bus. When a Full Speed USB packet starts, the USB bus will go from Idle J to data K. The data from the USB receiver 626, the ana_usb_rx_rcv signal is inverted during Full Speed mode at an inverter 732. For Low Speed mode another inverter 720 is coupled to a logic gate, for example an AND gate 722.

The inverter 732 output, the usb_rx_data_not signal, is also connected to an enable flip-flop 728. The enable flip-flop is part of an enable control circuit 724 that includes the enable flip-flop 728 and a reset gate 726 that is coupled to the reset port of the enable flip-flop 728 and determines when to reset the enable flip-flop 728. At the start of a Full Speed packet the inverter 732 causes a "0" to "1" transition on the clock input to the enable flip-flop 728. The enable flip-flop 728 is a rising edge flip-flop and generates an output signal, labeled the eusb_rep_txdm_enable signal. This output signal is set until an SE0 (single-ended zero) condition that occurs at the EOP.

The enable flip-flop output, the eusb_rep_txdm_enable signal, causes the eUSB data line to be enabled. The enable flip-flop 728 output causes the eUSB data line to be enabled at the output driver 636 shown in FIG. 6 to start driving packet data onto the eUSB bus. The eUSB Data Line determines the data that is driven onto the eUSB bus. The eUSB Data Line is driven by a path that starts from the ana_usb_rx_rcv signal output of the analog USB receiver 602, through a delay cell 734, the inverter 732 and the AND gate 722. The delay cell 734 delays the eUSB data signal based on a delay applied in the input filter circuit 712 that is after an SE0 condition of the Full Speed packet ends on the USB data signal.

As shown in FIG. 3, at the end of a packet, the EOP signaling includes the USB bus transitioning from data to a prolonged SE0 (with a duration of at least 1 UI) followed by a J condition. Upon detection of a valid SE0 the repeater 600 will stop driving the eUSB Data Line and drive the eUSB Control Line high.

A filtered SE0 indication, the usb_rx_se0 signal, from an input filter circuit 712 is applied through an AND gate that forms the reset gate 726 of the enable control circuit 724 to generate a reset signal, the rst_eusb_rep_tx_en_n signal, that is coupled to the enable flip-flop 728 and resets the enable flip-flop 728. The enable flip-flop 728 generates a reset eusb_rep_txdm_enable signal to disable the eUSB output driver 636. When this occurs, the eusb_rep_txdm_enable signal is then deasserted causing the eUSB data driver to be disabled.

The lockup detection circuit 650 detects when something has gone wrong. Any of the failures discussed above may be detected. As an example, the repeater 600 may be driving the eUSB bus with USB2 data but yet the USB2 input has not changed in a while. This indicates a stuck condition which could have occurred due to noise on the USB2 bus, an aborted packet on the eUSB bus, etc. The lockup detection circuit 612 detects this and allows the repeater 600 to recover by first generating a force_reset signal to the reset gate 726 of the enable control circuit 724. The force_reset signal is able to cause a reset of the enable flip-flop 728.

The eUSB to USB logic 610 determines, as a part of its operation, whether there is an SE1 (Single-Ended One) condition present on the eUSB bus. When that occurs, it generates a reset signal, labeled as the eUSB_rxse1_extended signal, to the enable control circuit 724. The SE1 condition occurs when an incoming USB packet is being passed to the eUSB bus at the same time that the eUSB host or device is trying to generate a Port Reset or a Control Message. Setting the eusb_rxse1_extended signal resets the enable flip-flop 728 and disables the eUSB Data Line to prevent the error. The eUSB to USB logic 610 may also generate a driving_usb_bus signal that is also coupled to the reset gate 726. The driving_usb_bus signal provides an indication that other circuitry is currently passing an incoming eUSB packet to the USB bus.

The high level logic 608 may also generate a rst_usb_2_eusb signal to reset the enable flip-flop 728. This is a general reset signal for the USB to eUSB logic and could be part of the normal power on operation or for some other reason. The high level logic 608 may also generate a rst_eusb_2_usb signal (not shown) to reset a similar flip-flop in the eUSB to USB logic 610.

The output of the reset gate 726 is labeled as the rst_eusb_rep_tx_en_n signal. This is the reset for the enable flip-flop 728. It will be asserted low at the end of a packet by the filtered SE0 indication. It will also be asserted low for any error detection detected by four other inputs to the reset gate 726. As explained above these include a force_reset signal, any eUSB SE1 conditions due to possible port reset or control messages as indicated by the eusb_rxse1_extended signal, any reset from the high level logic 608 possibly including power on reset, resets during control message reception, resets during non-repeating modes, etc., and any time the design is passing an eUSB packet to the USB bus.

Returning to the input filter circuit 712, the output filtered SE0 indication signal, the usb_rx_se0 signal, is also applied through an inverter 720 to AND gate 722 that is coupled to the eUSB Data Line. The output of the AND gate 722 is the eUSB Data Line. The outgoing eUSB data is the other input to the AND gate 722 so that the eUSB Data Line is forced low. The eUSB Data Line is forced low because the actual eUSB data driver will be kept enabled for 20-70 ns to drive the line low before releasing it. The filtered SE0 indication signal, the usb_rx_se0 signal, also enables the eUSB Control Line via a complex gate 744 in the logic core 702 that is coupled to the eUSB Control Line Enable. The eUSB Control Line driver data output is driven high upon the filtered SE0 indication using a "long" version of the SE0 status.

The end of USB packet's end of packet (EOP) signaling may be detected when the USB bus goes from the EOP's SE0 state to the J state. Upon detecting the end of the EOP, the repeater 600 stops driving the eUSB control line. The eUSB Control Line may be released after the SE0 condition ends. In some embodiments this is done using the eUSB Control Line Enable signal and the eUSB Control Line value. The eUSB Control Line Enable line will stop being driven after a time duration $T_{SE0\_Filt}$ after the end of the SE0 condition by use of the complex gate 744. The eUSB Control Line value will be held high during SE0 on the eUSB Control Line and will go low after a time duration $T_{SE0\_Filt}$ after the end of the SE0 condition by use of an OR gate 718 that is connected between the input filter circuit 712 and the eUSB Data Line.

The first AND gate 714 of the input filter circuit 712 is used to detect an unfiltered SE0 condition. The two single-ended input lines from the USB receiver, the ana_usb_rx_dp signal and the ana_usb_rx_dm signal are coupled as inverted signals to the first AND gate 714. A driving_usb_bus signal from the eUSB to USB logic 610 is also coupled to the first AND gate 714. The driving_usb_bus signal provides an indication to the first AND gate 714 that other circuitry is currently passing an incoming eUSB packet to the USB bus. When this signal is low, it indicates that an eUSB repeater side of the repeater 600 is not in the process of passing a packet from an eUSB bus to the USB bus as indicated by the driving_usb_bus signal. When this signal is low and the eUSB input lines are low, then the AND condition is satisfied and the first AND gate 714 output goes high. This indicates an SE0 condition is present on the USB bus for an incoming packet.

This output is applied to a first input of a second AND gate 716 of the input filter circuit 712. The second input of the second AND gate is an analog delay cell 713. The second AND gate goes high when the first AND gate is high and the delay has been reached. This output is a signal labeled the usb_rx_se0 signal. The analog delay cell 713 may be set to 14 ns or more to allow filtering of the false SE0 conditions. This delay is the value $T_{SE0\_Filt}$ referred to herein. The second AND gate 716 simply ANDs the unfiltered SE0 indication from the first AND gate 714 with the delayed version from the delay cell 713. This produces the usb_rx_se0 signal, which is the filtered SE0. It will be asserted after a delay time $T_{SE0\_Filt}$ after the valid SE0 condition and de-asserted as soon as the SE0 condition ends. This means that it will shorten the actual SE0 condition.

The delay cell 713 of the input filter circuit 712 that generates the usb_rx_rcv_delayed signal may be configured to match the SE0 filtering delay or any other suitable criterion. In one embodiment, the SE0 filtering delay is selected as 20 ns, the data delay is 10 ns, and the actual delay of the usb_rx_rcv_delayed signal is therefore 10 ns, although different amounts may be used.

The missing time caused by shortening the actual SE0 condition is recovered by using the output of the delay cell 713 as a signal for the simple delayed version of SE0 labeled the usb_rx_se0_delayed signal to extend the time that the eUSB control line is enabled. The filtered SE0 indication, the usb_rx_se0 signal, also enables the eUSB Control Line via a complex gate 744 in the logic core 702. The eUSB Control Line Enable is the output of the complex gate 744.

The complex gate 744 has an output from an OR gate 746 that is coupled to a three-terminal AND gate 748. The OR gate 746 inputs are coupled to the usb_rx_se0 signal and to the output of the three-terminal AND gate 748. The output of the complex gate 744 is high when either the usb_rx_se0 signal is high or when the three-terminal AND gate 748 is high. The three-terminal AND gate 746 has a first input coupled to the usb_rx_se0_delayed signal from the delay cell 713, a second input coupled to a usb_rx_deassertion_delayed signal described below, and a third input coupled to the inverse of the eusb_rep_txdm_enable signal described above which is the eUSB Data Line Enable. When the first two are high and the eUSB Data Line Enable is low then the eUSB Control Line Enable is extended beyond the time of the usb_rx_se0 signal. This provides the "long" version of the SE0 status.

Even though the logic core 702 stops driving the eUSB data for a time duration, $T_{SE0\_Filt}$, after the SE0 for the EOP starts, and even though the logic core 702 stops driving the eUSB control line after the time duration, $T_{SE0\_Filt}$, after the SE0 condition ends, the delay cells 630, 632 for the eUSB Data Line Enable and the eUSB Control Line Enable hold the lines enabled for a little longer. The delay time indicated as $T_{SE0\_Filt}$ is the delay applied to the usb_rx_se0 signal from the input filter circuit 712, which is the filtered SE0. The usb_rx_se0 signal is asserted at a time equal to this delay time after the valid SE0 condition and the usb_rx_se0 signal is de-asserted as soon as the SE0 condition ends. The delay cells 630, 632 balance out the delay caused in the input data at the delay cell 734 applied to the input data, the ana_usb_rx_rcv signal.

The usb_rx_se0_deassertion_delayed signal is generated in a set of three back-to-back flip-flops 740. This usb_rx_se0_deassertion_delayed signal is only asserted for a valid SE0 from an incoming USB packet's EOP. It is de-asserted some amount of time after the SE0 condition has gone away. It may be held longer than the value $T_{SE0\_Filt}$ to ensure that the eUSB Control Line is asserted long enough after the EOP.

Figure 8:
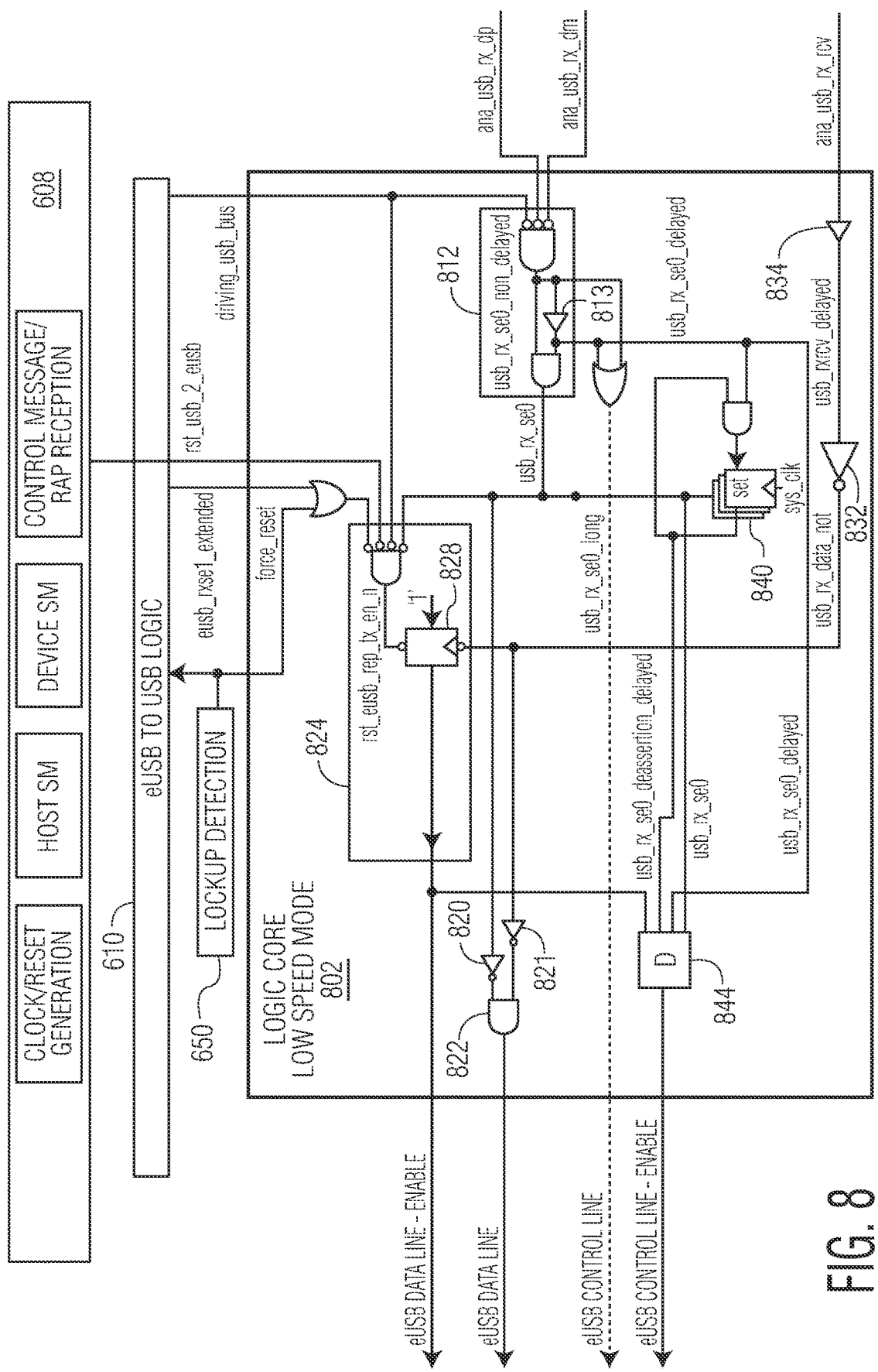
FIG. 8 is a block diagram of a logic core suitable for use as the logic core of the repeater for Low Speed (LS) mode on the differential USB bus.

FIG. 8 is a block diagram of a logic core 802 suitable for use as the logic core 620 of the repeater 600 for Low Speed (LS) mode on the differential USB bus. The logic core 802 includes an input filter circuit 812, an enable control circuit 824, an AND gate 822 at the eUSB Data Line, and a complex gate 844. These components have the same structure and operation as described above with respect to the logic core 702 for FS mode. The logic core 802 for LS mode also receives the same control and reset messages from the high level logic 608, the eUSB to USB logic 610 and the lockup detection circuit 612. These messages operate in the same way as described above.

The logic core 802 is coupled to and receives data from the USB receiver 626 of the analog USB receiver 602 and is coupled to and sends data to the analog eUSB transmitter 604. As described above, the eUSB Data Line carries the eUSB translation of the data from the USB receiver 626. The analog USB receiver 602 also provides the ana_usb_rx_dp signal and the ana_usb_rx_dm signal for detection of EOP. In contrast to Full Speed mode, in Low Speed mode, the eUSB control line is eD− and the eUSB data line is eD+. During Full Speed mode, the data is received in inverted form but during Low Speed mode, the data is not inverted. A USB "K" comes in as a "1." When a Low Speed USB packet starts, the USB bus will go from Idle K to data J. The data from the analog USB receiver 602 is inverted also during Low Speed mode at an inverter 832. The inverter 832 is coupled through another inverter 821 to an AND gate 822. The AND gate 822 output produces the non-inverted eUSB Data Line as described above with respect to FIG. 4.

The start of a packet in LS is a "0" to "1" transition on the output of the analog USB receiver 602. Because this goes through the inverter 832, it becomes a "1" to "0" transition. The usb_rx_data_not signal from the inverter 832 is provided to the AND gate 822 and also to the enable flip-flop 828 of the enable control circuit 824. However, in contrast to the rising edge enable flip-flop 728 of FIG. 7, the enable flip-flop 828 for LS mode is configured to trigger on the falling edge. This may be the same flip-flop as is used for the FS logic core 702 that is configured to operate in different modes or a different flip-flop that is switched in to change USB modes.

In the logic core 802, the SE0 filtering is larger for LS mode because the possible SE0 that may be seen during data transitions is as long as 210 ns as defined by the USB specification. The recommended filter delay is about 250 ns. Over process, voltage, and temperature (PVT) variations this will be greater than 210 ns as long as the delay elements are fabricated to an accuracy of within a +/−15% variation. The maximum delay requirement from the USB specification indicates that the maximum delay through a hub should be less than 300 ns during LS mode. The SE0 filtering is performed within the input filter circuit 812 that has a delay element 813. This delay element generates the usb_rx_se0_delayed signal that is used to extend the usb_rx_se0 signal. As described above the usb_rx_se0 signal is connected as an input to the enable control circuit 824, the complex gate 844, and the AND gate 822 at the eUSB Data Line. The usb_rx_se0_delayed signal is a part of the input filter circuit and is connected as an input to the eUSB Control Line, the complex gate 844, and the set of three flip-flops 840 that generate the usb_rx_se0_deassertion_delayed signal.

The data delay may be adjusted to match the SE0 filter delay of as described above for FS mode using about 10 ns for the delay labeled as $T_{SE0\_Filt}$. For LS mode, the filter mode is configured to accommodate the SE0 delay of about 250 ns. Using the 10 ns difference described above the SE0 filter delay would be about 240 ns. Different values may be selected to meet different circumstances. This delay is implemented using a delay cell 834 between the input signal the ana_usb_rx_rcv signal and the inverter 832 at the data input that generates the signal the usb_rx_data_not signal. The output of the delay cell 834 is a signal labeled as the usb_rxrcv_delayed signal.

As in the example of FIG. 7, the lockup detection circuit 612 is coupled to the eUSB to USB logic 610 and to the logic core 802 of the USB to eUSB logic 614. As described above with reference to FIG. 4 and FIG. 5, the lockup detection circuit 612 detects activity on the USB and eUSB busses and generates one or more force_reset signals which are then coupled to the eUSB to USB logic 610 and to the USB to eUSB logic 614 as a single signal or two different and unique signals. The force_reset signal is coupled through an OR gate as an input to a reset input of the enable flip-flop 828 of the enable control circuit 824. This allows the lockup detection circuit to reset the data line enable signal. This causes the repeater to tristate the data and control lines.

While the lockup detection circuit 650 has only been shown having a connection to the USB to eUSB logic 614 and only in LS mode and FS mode. A similar connection may be made to reset flip-flops of the eUSB to USB logic 610 and to operate in other modes including High-Speed (HS) mode. The force_reset signal may be coupled to more or different circuits in a repeater to accommodate different repeater configurations.

Figure 9:
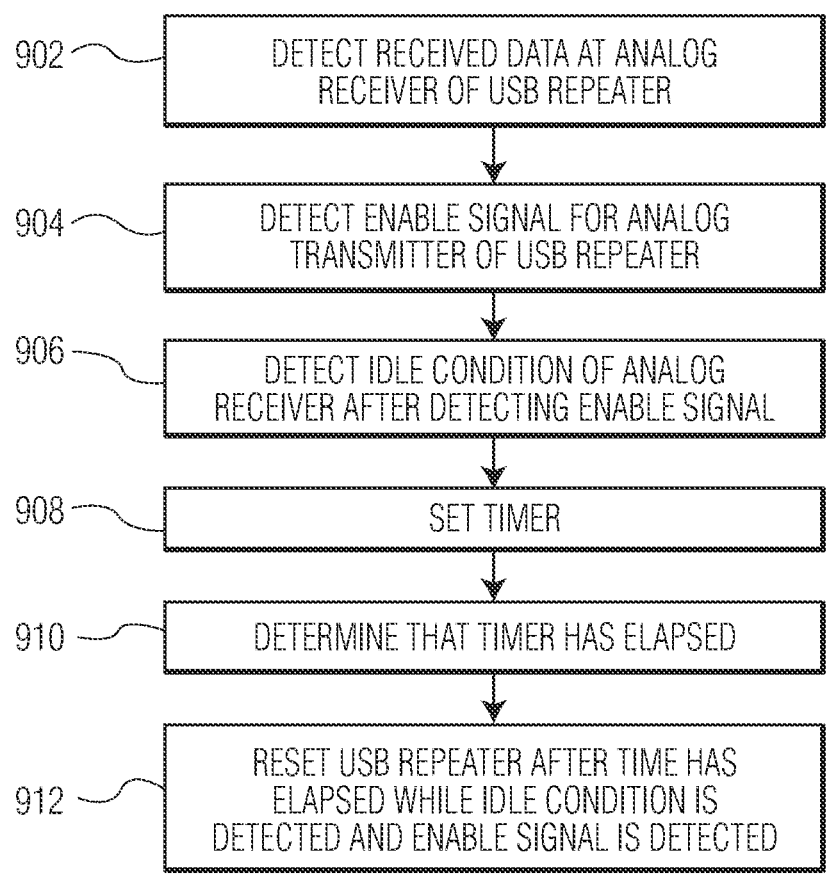
FIG. 9 is a process flow diagram of the operation of a lockup detection circuit in a USB to eUSB or eUSB to USB repeater as shown and described above

FIG. 9 is a process flow diagram of the operation of a lockup detection circuit in a USB to eUSB or eUSB to USB repeater having a simple physical structure as shown and described above. In particular the method may be performed to reset a USB to eUSB signal repeater and a eUSB to USB signal repeater in the event of a lockup. The lockup detection circuit may be reset when either the USB or eUSB bus is active. From a reset, the process begins at 902 with detecting received data at an analog receiver of the USB repeater.

At 904 the process continues with detecting an enable signal for an analog transmitter of the USB repeater.

At 906 the process continues with detecting an idle condition of the analog receiver after detecting the enable signal. In some embodiments, detecting the idle condition includes detecting that two input lines to the analog receiver are both low. In some embodiments, detecting the idle condition includes detecting that one input line is high and one input line is low. In some embodiments, the process includes determining a speed mode of the repeater and adjusting the detecting the idle condition based on the speed mode.

At 908 the process continues with setting a timer for an appropriate duration. The timer duration is longer than any normal messaging that is expected for the particular protocol, but otherwise as short as possible. With USB 10 Low Speed UI or more is suitable. The timer may be set before or after the idle condition is detected. The running of the timer does not start until after the idle condition is detected.

At 910 the process includes determining that the timer has elapsed. In the event that the idle condition does not last until the timer elapses, then the process returns to the beginning and there is no reset at 912. In common circumstances, the lockup condition circuit detects that the analog receiver is receiving an eUSB SE0 idle signal or USB idle signal.

At 912 the process ends with resetting the USB repeater after the timer has elapsed while an idle condition is detected and the enable signal is detected. The process may also include resetting the timer so that the lockup detection circuit is ready to repeat the process.

In the following description and claims, the term "coupled" along with its derivatives, may be used. "Coupled" is used to indicate that two or more elements have a connection that permits interaction but that there may be intervening physical or electrical components between them. "Electrically coupled" is used to indicate that the interaction is electrical as compared to physical, magnetic, or another form of interaction. As used in the claims, unless otherwise specified, the use of the ordinal adjectives "first," "second," "third," etc., to describe a common element, merely indicate that different instances of like elements are being referred to, and are not intended to imply that the elements so described must be in a given sequence, either temporally, spatially, in ranking, or in any other manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of lockup detection for an eUSB repeater, the method comprising:
   detecting received data at an analog receiver on a first side of the eUSB repeater;
   detecting an enable signal for an analog transmitter on a second side of the eUSB repeater;
   detecting an idle condition of the analog receiver on the first side of the eUSB repeater after detecting the enable signal;
   setting a timer;
   determining that the timer has elapsed; and
   resetting the eUSB repeater after the timer has elapsed while an idle condition is detected on the first side and the enable signal is detected on the second side of the eUSB repeater.

2. The method of claim 1, wherein detecting an idle condition comprises detecting that two input lines to the analog receiver are both low.

3. The method of claim 1, wherein detecting an idle condition comprises detecting that an Idle "J" is present on two input lines to the analog receiver.

4. The method of claim 1 wherein detecting an idle condition comprises detecting that an input line to the analog receiver is high and another input line to the analog receiver is low.

5. The method of claim 1, further comprising determining a speed mode of the eUSB repeater and detecting an idle condition based on the speed mode.

6. The method of claim 1, further comprising resetting the timer whenever the idle condition is not present on the first side of the eUSB repeater.

7. The method of claim 1, wherein the timer has a duration of at least 10 USB Low Speed Unit Intervals (UI).

8. The method of claim 1, wherein determining that the timer has elapsed comprises detecting that the enable signal is active for a duration of the timer.

9. The method of claim 1, wherein determining that the timer has elapsed comprises detecting that the analog receiver is receiving an SE0 idle (eUSB) or a J (USB) for a duration of the timer.

10. The method of claim 1, further comprising:
    generating a possible lockup signal when the idle condition is detected and the enable signal is detected; and
    applying the possible lockup signal to a counter,
    wherein determining that the timer has elapsed comprises determining that the counter has incremented to reach a pre-configured count.

11. The method of claim 1, wherein resetting the eUSB repeater comprises applying reset signals to state elements of the eUSB repeater that control the data signals of the eUSB repeater.

12. The method of claim 11, wherein resetting the eUSB repeater comprises applying reset signals to state elements of the eUSB repeater that control the control signals of the eUSB repeater.

13. The method of claim 1, wherein resetting the eUSB repeater comprises applying reset signals to flip-flops of the eUSB repeater that determine an end of packet.

14. A lockup detection circuit for an eUSB repeater, the circuit comprising:
    a first logic gate coupled to an analog receiver of the eUSB repeater to generate an idle signal upon detecting an idle condition of an input of the analog receiver;
    an AND gate coupled to the first logic gate and to an analog transmitter of the eUSB repeater to receive an enable signal, the AND gate to generate a possible lockup signal upon receiving the idle signal and the enable signal;
    a timer coupled to the possible lockup signal, the timer being started in response to the possible lockup signal; and
    a second logic gate to reset the eUSB repeater after the timer has elapsed while the idle condition is detected and the enable signal is detected.

15. The circuit of claim 14, wherein the analog receiver is coupled to two input lines of a first bus and wherein the first logic gate detects the idle condition upon detecting that the two input lines are both low.

16. The circuit of claim 14, wherein the first logic gate is coupled to a mode selector signal to indicate a low speed mode or a full speed mode, the first logic gate being configured to generate the idle signal in response to the mode selector signal and upon detecting an idle condition of an input of the analog receiver.

17. An eUSB repeater comprising:
an analog receiver coupled to a first bus;
an analog transmitter coupled to a second bus having an enable signal that is active when the analog transmitter is active;
repeating mode logic between the analog receiver and the analog transmitter to repeat data received on the first bus through the analog receiver to the second bus through the analog transmitter; and
a lockup detection circuit having a first logic gate coupled to the analog receiver to generate an idle signal upon detecting an idle condition of the analog receiver, an AND gate coupled to the first logic gate and to the analog transmitter to receive the enable signal, the AND gate to generate a possible lockup signal upon receiving the idle signal and the enable signal, a timer coupled to the possible lockup signal, the timer being started in response to the possible lockup signal, and a second logic gate coupled to the repeating mode logic to reset the repeating mode logic after the timer has elapsed.

18. The repeater of claim 17, wherein the second logic gate is further coupled to the timer to reset the timer after the timer has elapsed.

19. The repeater of claim 17, wherein the repeating mode logic comprises a state element configured to control signal paths through the repeating mode logic and wherein the second logic gate is coupled to the state element to clear the state of the state element.

20. The repeater of claim 17, wherein the lockup detection circuit further comprises:
a first detection logic gate coupled to input lines of the analog receiver and configured to generate a first idle signal in response to a first mode of the first bus, the first idle signal being coupled to the first logic gate; and
a second detection logic gate coupled to the input lines of the analog receiver and configured to generate a second idle signal in response to a second mode of the first bus, wherein the first logic gate is coupled to a mode selector signal and selects the first idle signal or the second idle signal as the idle signal in response to the mode selector signal.

* * * * *